(12) United States Patent
Kuniholm et al.

(10) Patent No.: US 12,440,356 B2
(45) Date of Patent: Oct. 14, 2025

(54) PRESSURE-RELIEVING FLEXURAL LOAD-BEARING STRAP AND RELATED SYSTEMS AND METHODS

(71) Applicant: Stumpworx LLC, Portland, OR (US)

(72) Inventors: Jonathan Kuniholm, Portland, OR (US); Zachary Meyer, Portland, OR (US)

(73) Assignee: Stumpworx LLC, Portland, OR (US)

( * ) Notice: Subject to any disclaimer, the term of this patent is extended or adjusted under 35 U.S.C. 154(b) by 213 days.

(21) Appl. No.: 18/365,109

(22) Filed: Aug. 3, 2023

(65) Prior Publication Data

US 2023/0372126 A1 Nov. 23, 2023

Related U.S. Application Data

(63) Continuation-in-part of application No. 17/494,828, filed on Oct. 5, 2021, now Pat. No. 11,950,685.
(Continued)

(51) Int. Cl.
*A61F 2/78* (2006.01)
*A41F 9/02* (2006.01)
(Continued)

(52) U.S. Cl.
CPC .......... *A61F 2/78* (2013.01); *A41F 9/02* (2013.01); *B32B 3/266* (2013.01); *B32B 5/026* (2013.01);
(Continued)

(58) Field of Classification Search
CPC ...... A61F 2/78; A61F 2002/7862; A41F 9/02; B32B 3/266; B32B 5/026; B32B 5/073;
(Continued)

(56) References Cited

U.S. PATENT DOCUMENTS

| 999,484 A | 8/1911 | Carnes |
|---|---|---|
| 1,173,219 A | 2/1916 | Rowley |

(Continued)

FOREIGN PATENT DOCUMENTS

| CA | 2304743 A1 | 11/2000 |
|---|---|---|
| CA | 2325607 A1 | 5/2002 |

(Continued)

OTHER PUBLICATIONS

Alley et al., "Prosthetic Sockets Stabilized by Alternating Areas of Tissue Compression and Release," 48 JRRD. 679-96 (2010).
(Continued)

*Primary Examiner* — Cynthia L Schaller
(74) *Attorney, Agent, or Firm* — Kolitch Romano Dascenzo Gates LLC

(57) ABSTRACT

Textile assemblies may be incorporated into a textile strap and include a stretch textile substrate and a patterned textile laminate. The textile substrate has a width extending from a first edge to a second edge. The patterned textile laminate is non-stretch or low-stretch, and coupled to the stretch textile substrate. The patterned textile laminate has a plurality of holes formed therethrough, configured to enhance breathability of the textile assembly. A span of the patterned textile laminate has a plurality of gaps formed therethrough to create a gradient of flexibility and compliance within the span of the patterned textile laminate, such that the stretch of the textile assembly varies along a continuum across the width of the textile assembly. Straps and/or harnesses of various uses may incorporate such textile assemblies, including harnesses for supporting prosthetic limbs, climbing and safety harnesses, and military or policy duty belts.

19 Claims, 19 Drawing Sheets

Related U.S. Application Data

(60) Provisional application No. 63/370,446, filed on Aug. 4, 2022, provisional application No. 63/087,497, filed on Oct. 5, 2020.

(51) Int. Cl.

| | | |
|---|---|---|
| *B32B 3/26* | (2006.01) | |
| *B32B 5/02* | (2006.01) | |
| *B32B 5/06* | (2006.01) | |
| *B32B 5/14* | (2006.01) | |
| *B32B 5/26* | (2006.01) | |
| *B32B 7/022* | (2019.01) | |
| *D04B 1/16* | (2006.01) | |
| *D04B 1/22* | (2006.01) | |
| *D04B 21/16* | (2006.01) | |
| *D04B 21/20* | (2006.01) | |

(52) U.S. Cl.
CPC ............. *B32B 5/073* (2021.05); *B32B 5/142* (2013.01); *B32B 5/26* (2013.01); *B32B 7/022* (2019.01); *D04B 1/16* (2013.01); *D04B 1/22* (2013.01); *D04B 21/16* (2013.01); *D04B 21/20* (2013.01); *A61F 2002/7862* (2013.01); *B32B 2250/20* (2013.01); *B32B 2255/02* (2013.01); *B32B 2255/26* (2013.01); *B32B 2262/0261* (2013.01); *B32B 2307/51* (2013.01); *B32B 2307/546* (2013.01); *B32B 2307/724* (2013.01); *B32B 2535/00* (2013.01); *D10B 2331/02* (2013.01); *D10B 2401/10* (2013.01)

(58) Field of Classification Search
CPC .......... B32B 5/142; B32B 5/26; B32B 7/022; B32B 2250/20; B32B 2255/26; B32B 2262/0261; B32B 2307/51; B32B 2307/546; B32B 2307/724; B32B 2535/00; B32B 3/30; D04B 1/16; D04B 1/22; D04B 21/16; D04B 21/20; D10B 2331/02; D10B 2401/10; A45F 2003/146; A45F 2003/144; A45F 3/14
See application file for complete search history.

(56) References Cited

U.S. PATENT DOCUMENTS

| | | |
|---|---|---|
| 1,206,753 A | 11/1916 | Desmore |
| 1,263,675 A | 4/1918 | Jeffery |
| 1,277,747 A | 9/1918 | O'Connor |
| 1,285,326 A | 11/1918 | Nelson |
| 1,507,683 A | 9/1924 | Pecorella et al. |
| 1,989,960 A | 2/1935 | Wheeler et al. |
| 2,409,884 A | 10/1946 | Mollenhour |
| 2,494,646 A | 1/1950 | Crawshaw |
| 2,554,237 A | 5/1951 | Blackburn |
| 2,668,959 A | 2/1954 | Sargeson |
| 2,793,368 A | 5/1957 | Nouel |
| 3,434,469 A | 3/1969 | Swift |
| 3,905,503 A | 9/1975 | Fraze |
| 4,125,904 A | 11/1978 | Levine |
| 4,258,441 A | 3/1981 | Bell |
| 5,018,652 A | 5/1991 | Holtzclaw, Jr. |
| 5,181,638 A | 1/1993 | McHale |
| 5,765,735 A | 6/1998 | Kimchi et al. |
| 5,961,019 A | 10/1999 | Gleason et al. |
| 6,793,112 B2 | 9/2004 | Ammerman |
| 7,198,610 B2 | 4/2007 | Ingimundarson et al. |
| 7,431,184 B2 | 10/2008 | Gregory |
| 7,743,885 B2 | 6/2010 | Martin et al. |
| 8,323,353 B1 | 12/2012 | Alley et al. |
| 8,821,588 B2 | 9/2014 | Latour |
| 8,978,224 B2 | 3/2015 | Hurley et al. |
| 8,998,053 B2 | 4/2015 | Cromie et al. |
| 9,044,349 B2 | 6/2015 | Hurley et al. |
| 9,283,093 B2 | 3/2016 | Alley |
| 9,486,031 B2 | 11/2016 | Dua et al. |
| 9,549,828 B2 | 1/2017 | Hurley et al. |
| D778,452 S | 2/2017 | Cespedes et al. |
| 9,581,414 B1 | 2/2017 | Mironski |
| 9,750,643 B2 | 9/2017 | Convert et al. |
| 10,123,888 B2 | 11/2018 | Alley et al. |
| 10,159,592 B2 | 12/2018 | Ingimundarson et al. |
| 10,179,056 B2 | 1/2019 | Hurley et al. |
| 10,278,837 B1 | 5/2019 | Martin |
| 10,369,027 B2 | 8/2019 | Alley |
| 10,543,112 B2 | 1/2020 | Bache et al. |
| 11,168,416 B2 | 11/2021 | Huffa et al. |
| 11,470,889 B2 | 10/2022 | Huffa et al. |
| 2004/0185247 A1 | 9/2004 | Fenton et al. |
| 2005/0131322 A1 | 6/2005 | Harris, Jr. et al. |
| 2007/0007314 A1 | 1/2007 | Lin |
| 2007/0245526 A1 | 10/2007 | Fidrych et al. |
| 2008/0142557 A1 | 6/2008 | Hess et al. |
| 2011/0071647 A1 | 3/2011 | Mahon |
| 2011/0208321 A1 | 8/2011 | Doddroe et al. |
| 2012/0037674 A1* | 2/2012 | Crandall ................... A45F 3/12 224/257 |
| 2012/0101597 A1 | 4/2012 | Bache |
| 2012/0141750 A1 | 6/2012 | Taylor |
| 2013/0263859 A1* | 10/2013 | Ho .................... A61M 16/0683 128/206.21 |
| 2014/0121783 A1 | 5/2014 | Alley |
| 2015/0032041 A1 | 1/2015 | Ingimundarson et al. |
| 2015/0366678 A1 | 12/2015 | Edwards et al. |
| 2017/0000216 A1 | 1/2017 | Dua et al. |
| 2017/0020270 A1* | 1/2017 | Pactanac ................... A45F 3/04 |
| 2017/0128238 A1 | 5/2017 | Hurley et al. |
| 2017/0151072 A1 | 6/2017 | Mahon et al. |
| 2018/0214284 A1 | 8/2018 | Wagner et al. |
| 2019/0200693 A1 | 7/2019 | Bishop |
| 2020/0163783 A1 | 5/2020 | Martin |
| 2020/0345521 A1 | 11/2020 | Mahon et al. |
| 2022/0062014 A1 | 3/2022 | Martin |
| 2022/0282410 A1 | 9/2022 | Dua et al. |
| 2023/0038383 A1 | 2/2023 | Dua et al. |
| 2023/0088406 A1 | 3/2023 | Mahon |

FOREIGN PATENT DOCUMENTS

| | | |
|---|---|---|
| CN | 115734720 A | 3/2023 |
| DE | 102014220087 B4 | 5/2016 |
| EP | 3178342 A1 | 6/2017 |
| EP | 3508628 A1 | 7/2019 |
| EP | 3567146 A1 | 11/2019 |
| ES | 2642964 T3 | 11/2017 |
| JP | 2022081489 A | 5/2022 |
| WO | 2006138388 A2 | 12/2006 |
| WO | 2018144736 A1 | 8/2018 |

OTHER PUBLICATIONS

Fryer, Charles M., "Upper-Limb Prosthetics: Harnessing and Controls for Body-Powered Devices," 6B Atlas of Limb Prosthetics: Surgical, Prosthetic, and Rehabilitation Principles, 2ed. American Academy of Orthopedic Surgeons, Rosemont, IL (2002).

Mutnick, Ally, "McCormick Freshman Design Prosthetic Arms for Amputee Patients," The Daily Northwestern (Jan. 9, 2013), https://dailynorthwestern.com/2013/01/09/campus/mccormick-freshmen-design-prosthetic-arms-for-amputee-patients/.

Miguelez et al., "The Transradial Anatomically Contoured (TRAC) Interface: Design Principles and Methodology," 15 JPO. 148-57 (2003).

Paterno et al., "Sockets for Limb Prostheses: A Review of Existing Technologies and Open Challenges," 65 IEEE. 1996-2010 (Sep. 2018).

Sokolowski et al., "A Product Design Approach to Prosthetic Design: A Case Study," 3304 DMD Proc. (2019).

Taylor, Craig. L., "The Biomechanics of Control in Upper-Extremity Prostheses," 2, 3 Artificial Limbs 4-25 (1955).

(56) References Cited

OTHER PUBLICATIONS

Wang et al., "Physical and Mechanical Testing of Textiles," Fabric Testing, 4, 90-124 (Dec. 2008).
Wikipedia Encyclopedia, "Breathability," http.wikipedia.com/breathability, (Nov. 2, 2022).
Machine-generated English language translation of Spanish Patent No. ES2642964T3, issued Nov. 20, 2017.
The Science Museum Group, "Artificial Right Leg," 1999-471, Orthopaedics, Richmond Twickenham and Roehampton Healthcare NHS Trust, New York, United States (1910-1914).
Fillauer LLC, "WD Quick Change Wrist" product page, (Apr. 18, 2023) https://fillauer.com/products/wd-quick-change-wrist/.
Machine-generated English language translation of Japanese Patent Application Publication No. JP2022081489A, published May 31, 2022.
Machine-generated English language translation of Chinese Patent Application Publication No. CN115734720A, published Mar. 3, 2023.
Machine-generated English language translation of German Patent No. DE102014220087B4, issued May 12, 2016.
Kuniholm, Jonathan, International Society for Prosthetics and and Orthotics, "Variable Compliance Transradial Prosthetic Socket Allowing Full Anatomical Range of Motion Using Stiff Motion Counters in a Breathable Soft Matrix" presentation, 17th World Congress, Kobe Convention Center, Kobe, Hyogo, Japan (Oct. 8, 2019).
Kuniholm et al., International Society for Prosthetics and and Orthotics, "Breathable Non-Slip Body-Powered Upper Limb Prosthetic Harness with One-handed Hardware, Designed to Eliminate Axillary Pressure and Distribute Loads" presentation, 17th World Congress, Kobe Convention Center, Kobe, Hyogo, Japan (Oct. 8, 2019).
Nash, Zachary, Pensole Footwear Design Academy, "This is Jake" presentation, IFN Platform Challenge, 10 NW 5th Avenue, Portland, Oregon 97209 (Jun. 26, 2015).
International Society for Prosthetics and Orthotics, 17th World Congress Abstract Book, "Prosthetics and Orthotics International" 43.1, p. 379, Kobe, Hyogo, Japan (Sep. 30, 2019).

* cited by examiner

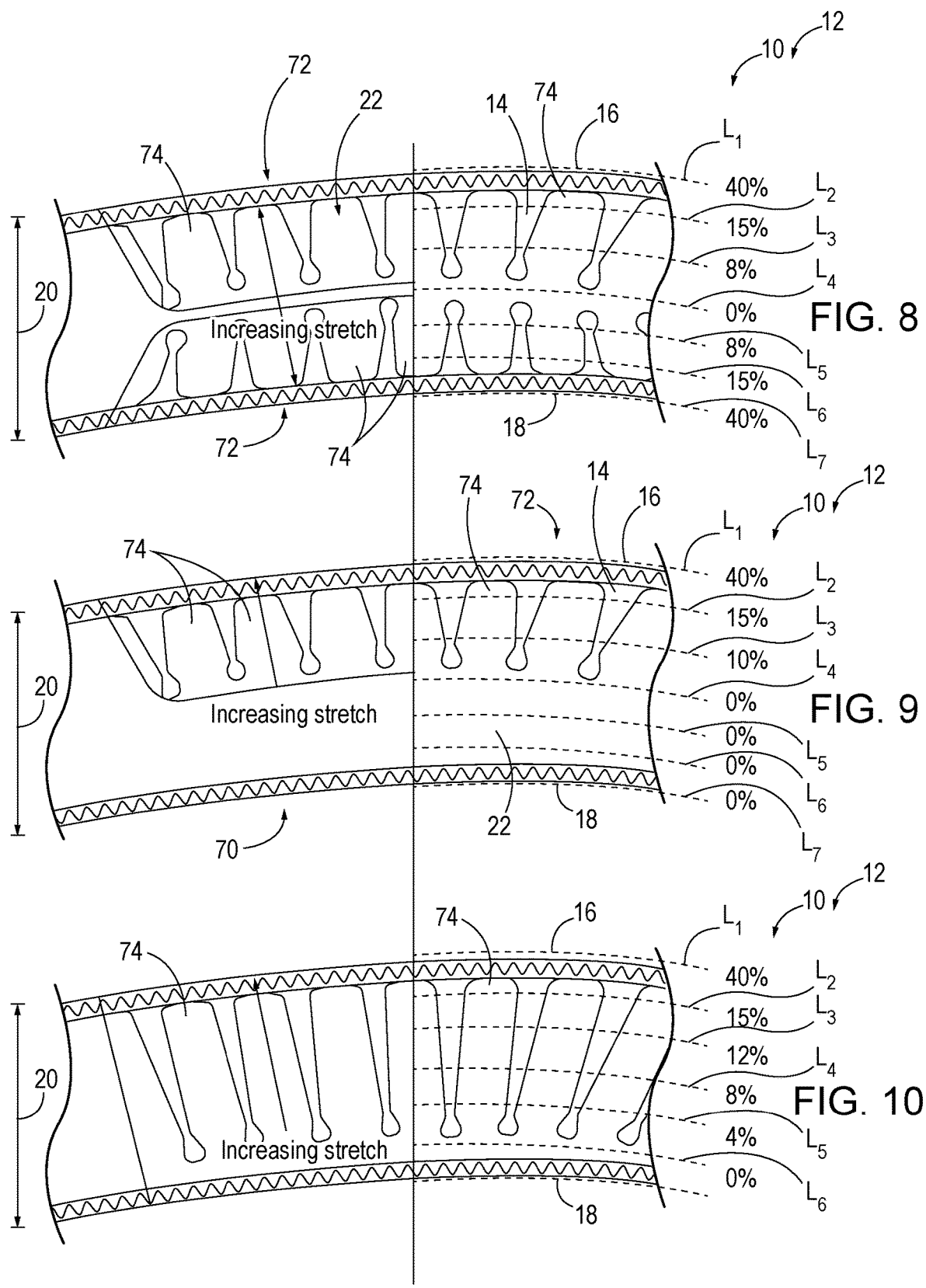

PRESSURE-RELIEVING FLEXURAL LOAD-BEARING STRAP AND RELATED SYSTEMS AND METHODS

RELATED APPLICATIONS

This application is a continuation-in-part of U.S. Non-Provisional patent application Ser. No. 17/494,828, entitled "PRESSURE-RELIEVING FLEXURAL LOAD BEARING STRAP AND METHOD FOR MANUFACTURING SAME," which was filed on Oct. 5, 2021 and claims priority to U.S. Provisional Patent Application No. 63/087,497, entitled "PRESSURE RELIEVING FLEXURAL LOAD BEARING STRAP AND METHOD FOR MANUFACTURING SAME," which was filed on Oct. 5, 2020, the complete disclosures of which are incorporated herein by reference. This application also claims priority to U.S. Provisional Patent Application No. 63/370,446, entitled "PRESSURE RELIEVING FLEXURAL LOAD BEARING COMPONENT AND METHOD FOR MANUFACTURING SAME," which was filed on Aug. 4, 2022, the complete disclosure of which is incorporated herein by reference.

FIELD

The present disclosure relates generally to pressure-relieving components, more particularly to straps and other components, having variable flexibility across a width.

BACKGROUND

Human beings do not comfortably bear burdens against their bodies, especially in examples of a load using one or more straps to concentrate the weight of the burden in a narrow band over skin and muscle, which drives the straps into contact with underlying bones and soft tissue. Straps conventionally designed for load-bearing are generally arranged to be worn across regions of the body that can most comfortably bear weight, yet large loads can cause the supporting tissue to become painful and fatigued over time, particularly at the edges of these straps where the underlying tissue transitions to supporting the load. While wider straps can distribute the load more effectively, wider straps can also restrict motion. Thus, when using such straps, rather than enabling more natural movement, wider straps tend to impede movement of the body. Wider straps that do not conform to the body also often dig into the body at the edge that first contacts the body under load, gapping and losing contact across the strap and at the other edge. Conventional straps also attempt to provide relief from the weight of a load with added thicknesses of padding, though this padding or bulkiness also can impair movement and function of the body, especially when these straps are worn under clothing or other straps.

In certain contexts, these disadvantages can create larger problems and even safety issues. For example, in the case of military personnel, multiple loads consisting of body armor, ammunition, and other equipment is borne via backpacks and harnesses that must all be supported by the shoulders and hips. The design and construction of various straps used in these backpacks and harnesses, combined with the magnitude of the load itself, greatly impact the mobility and therefore the survivability of soldiers. Similarly, duty belts worn by police officers hold items such as handcuffs, batons, radios, pistols in holsters, pepper spray, notebooks, and more bulky items that are usually attached to a thick leather or synthetic belt. Conventional duty belts fail to account for ergonomics of one's hip bones with which they are intended to interface, and tend to be bulky due to various plates and pads that are added to the belt. Furthermore, traditional duty belts distribute loads poorly, and often cause back and shoulder pain, as well as numbness and sores from long hours of heavy use and movement, and from a single edge that digs into the body under load.

Straps and harnesses also are used as safety rigging for activities such as ice and rock climbing, media production, construction, and cleaning or arborist work, for which people sometimes spend long hours wearing and/or suspended from torso or seat harnesses. As a result, wearers can suffer fatigue and pain, as well as "suspension trauma" (also known as "harness-induced pathology" or "orthostatic shock while suspended"), possibly caused by the pressure of harness loops on the wearer's blood vessels. In severe cases, suspension trauma has led to loss of consciousness or other symptoms that may account for fatal accidents.

In the context of limb amputees, harnesses and straps may be used to secure a prosthetic limb to the body or to actuate a prosthetic control cable, though many amputees either reject or have never worn a prosthetic limb, often citing issues related to attachment of the prosthetic limb to the body. For example, while these harness attachments often are necessary to provide both control functionality and the tensile load-bearing capability of body-powered upper limb prostheses, amputees often reject them outright due to discomfort with the harnesses, poor heat and moisture management, axillary pressure and neuropathy, bulkiness, appearance over clothing, comfort under clothing, and/or odor generated from repeated wearing (even despite regular cleaning). In many cases, conventional harnesses are attached to the body via the sound arm, and may cause nerve damage or neuropathy in said sound arm as a result of digging in to the arm, armpit region, back, torso, neck, and/or shoulder. When tensioned, conventional harnesses often produce uncomfortable and unsightly buckling opposite the tensioned area. Attempts to add padding to conventional harnesses have been largely unsuccessful, because a step transition between the padding and stretch areas of the harness still results in discomfort. Indeed, the most common criticisms of even the most advanced prosthetic arms tend to surround the suspension of the devices from the body rather than the devices themselves.

In sum, the shortcomings and risks of the straps and belts of load-bearing harnesses are common in many areas of application. Complaints include, beyond mere pressure on the tissues of the body, edges of the straps cutting and digging into the body, edges and features of items attached to the straps doing the same, inability to properly distribute the required load, and lacking the proper contour in two or three dimensions to properly conform to the shape of the body, which can lead to direct pain from an uncomfortably placed load or indirect pain caused by bodily compensation for improper loading. Further, straps and padding added to such used therein or thereon routinely fail to breathe and transport moisture, compounding the problems created when they are used to bear heavy loads, resulting in chafing and sores.

SUMMARY

Presently disclosed textile assemblies are configured to comfortably bear burdens attached to a wearer's body (or a burden of their body attached to something else), by easing a transition from edges of key sections of the textile assembly to portions of the textile assembly bearing the most weight. Presently disclosed textile assemblies may be configured to conform to the wearer's body and transport moisture from any bearing surface of the wearer's body, and incorporate a combination of stretch and non-stretch (or low-stretch) materials encased in a stretch outer shell, such that the overall composite assembly has regions of stretch and non-stretch that smoothly transition into one another.

In an example, a textile assembly configured to be incorporated into a textile strap includes a stretch textile substrate and a patterned textile laminate. The stretch textile substrate has a width extending from a first edge to a second edge. The patterned textile laminate is formed of one or more non-stretch or low-stretch materials, and is coupled to the stretch textile substrate. The patterned textile laminate may include a plurality of holes formed therethrough that are configured to enhance breathability of the textile assembly. A span of the patterned textile laminate may include a plurality of gaps, or spaces, formed between adjacent tabs, or fingers, that are configured to create a gradient of flexibility and compliance within the span of the patterned textile laminate. Such textile assemblies may be encased in a stretch outer shell to form straps, harnesses, belts, and other devices used to transfer loads to a human or animal body.

Methods of making a textile assembly also are within the scope of the present disclosure. Such methods may include forming a plurality of holes in a patterned textile laminate, with the patterned textile laminate being formed of one or more non-stretch or low-stretch materials, such that the plurality of holes are configured to enhance breathability of the textile assembly. Methods also may include forming a plurality of gaps within a span of the patterned textile laminate, such that the plurality of gaps create a gradient of flexibility and compliance within the span of the patterned textile laminate. Methods also may include coupling a stretch textile substrate to the patterned textile laminate, where the stretch textile substrate has a width extending from a first edge to a second edge, and with the plurality of gaps being spaced apart from the first edge and the second edge. In this manner, disclosed textile assemblies, and/or straps, belts, or harnesses including the same, may be made to have stretch characteristics that smoothly vary, or transition, across the width of the textile assembly, such that one side of the textile assembly may be configured to stretch a desired amount, while the opposite side of the textile assembly may exhibit a lower degree of stretch, or even almost no stretch. In some examples, this may be accomplished without discrete steps in the variance of the stretch characteristics, and thus may be configured to increase comfort for wearers as compared to conventional straps and harness designs.

BRIEF DESCRIPTION OF THE DRAWINGS

FIG. 8 is an example of geometry for a patterned textile laminate of presently disclosed textile assemblies.

FIG. 9 is an example of geometry for a patterned textile laminate of presently disclosed textile assemblies.

FIG. 10 is an example of geometry for a patterned textile laminate of presently disclosed textile assemblies.

DESCRIPTION

Figure 1:
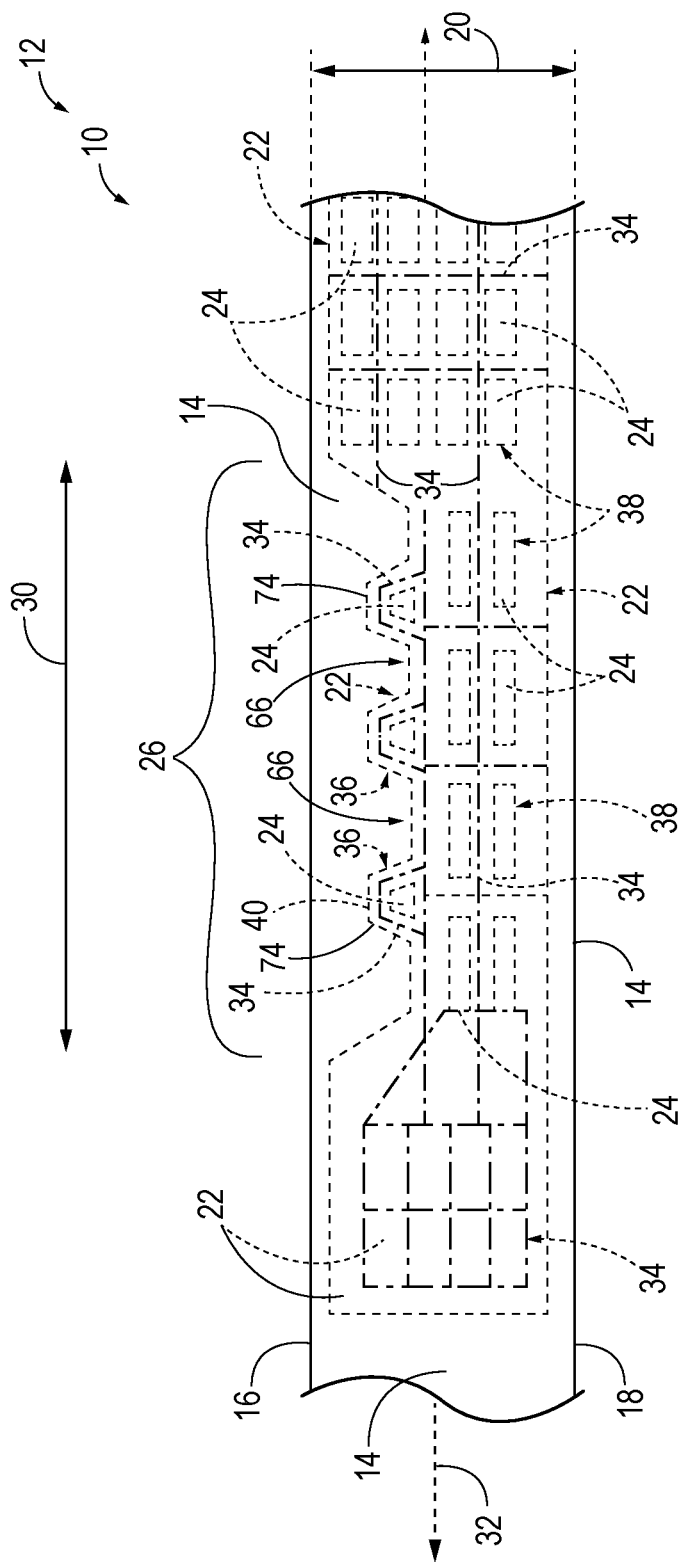
FIG. 1 is a schematic representation of illustrative examples of textile assemblies according to the present disclosure.
Figure 2:
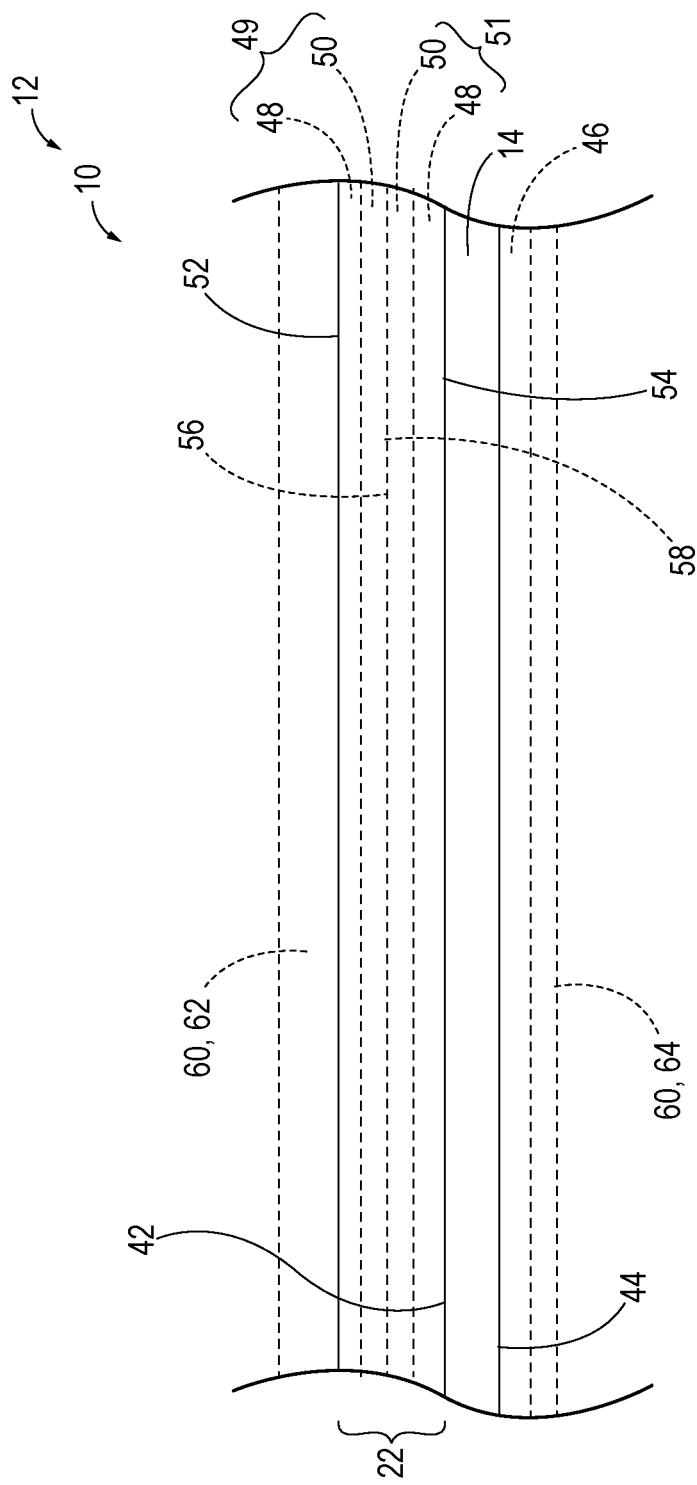
FIG. 2 is a schematic cross-sectional representation of illustrative examples of textile assemblies according to the present disclosure.

FIGS. 1-2 provide illustrative, non-exclusive examples of textile assemblies 10 according to the present disclosure. Elements that serve a similar, or at least substantially similar, purpose are labeled with like numbers in each of FIGS. 1-2, and these elements may not be discussed in detail herein with reference to each of FIGS. 1-2. Similarly, all elements may not be labeled in each of FIGS. 1-2, but reference numerals associated therewith may be utilized herein for consistency. Elements, components, and/or features that are discussed herein with reference to one or more of FIGS. 1-2 may be included in and/or utilized with any of FIGS. 1-2 without departing from the scope of the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

Textile assemblies 10 generally are configured to be incorporated into a textile strap to transfer one or more loads to a wearer. Illustrative, non-limiting examples of applications for disclosed textile assemblies 10 include harnesses for prosthetic limbs, climbing and safety harnesses, military or police duty belts, and backpack straps. Textile assemblies 10 generally have a gradient of elasticity, or degree of stretch, that varies smoothly across its width and/or length. In this manner, textile assemblies 10 may be configured to transfer loads to the wearer in a more comfortable way, without digging in to the wearer's body, and distributing the load more effectively than conventional straps or harnesses. To accomplish this, disclosed textile assemblies 10 generally include a stretch textile substrate 14 (which may also be referred to herein simply as textile substrate 14) and a patterned textile laminate 22 that is coupled to stretch textile substrate 14. As shown in FIG. 1, textile substrate 14 extends from a first edge 16 to a second edge 18, thereby defining a width 20, which may be constant or variable along the length of stretch textile substrate 14. Width 20 also generally corresponds to a width of textile assembly 10, as well. In other words, textile substrate 14 may be the widest component of textile assembly 10, such that width 20 of textile substrate 14 defines an overall width of the textile assembly 10, as well. In some examples, at least a portion of patterned textile laminate 22 is narrower than width 20 of stretch textile substrate 14, though patterned textile laminate 22 may have a width at least approximately equal to width 20 of textile substrate 14 in some areas of textile assembly 10. As used herein, patterned textile laminate 22 is considered "patterned" because it includes a plurality of areas where fabric is removed to form holes 24 and gaps 66 through the textile laminate, and because the textile laminate is cut into a desired shape to provide strength in particular locations for a specific use of disclosed textile assemblies 10. Holes 24 and gaps 66 are generally only formed through patterned textile laminate 22, and do not extend through other layers of textile assembly 10, though they may in some examples.

While textile substrate 14 is generally formed of a stretch or elastic material, patterned textile laminate 22 is generally formed of a non-stretch or low-stretch material. Textile assembly 10 may be considered a composite assembly, as it is formed from a combination of different materials having different material properties and mechanical characteristics, including the textile substrate 14, patterned textile laminate 22, and/or one or more additional components such as a stitching 34, an adhesive film, or stretch glue layer 46, and/or an outer shell 60, as described herein. The mechanical characteristics and the material properties of the overall composite textile assembly 10, therefore, are determined by the interaction of all the textile assembly's components, with some regions of the overall textile assembly exhibiting a degree of stretch, while other regions of the overall textile assembly are limited in stretch and/or non-stretch. The textile assembly 10 may be configured to have composite features of lateral variable compliance combined with functional, axial non-stretch features of patterned textile laminate 22.

In some examples, patterned textile laminate 22 includes one or more non-stretch or low-stretch layers, which may provide a small degree of mechanical stretch along a weave of a woven material. Patterned textile laminate 22 includes a plurality of holes 24 and a plurality of gaps 66 formed through patterned textile laminate 22. Holes 24 are configured to enhance breathability of textile assembly 10, while gaps 66 are configured to create a gradient of flexibility and compliance across textile assembly 10. Specifically, non-stretch fabrics of patterned textile laminate 22 generally are not inherently breathable or wicking materials, though the formation of holes 24 therethrough can allow for improved breathability and/or wicking in the overall textile assembly 10 that includes patterned textile laminate 22. Generally, textile assemblies 10 and textile straps 12 incorporating the same have a width 20 sufficient for comfortable distribution of loads applied to the wearer's body via a strap or an assembly. One or more of a selection of breathable materials for components of textile assembly 10 and textile strap 12, the width of textile assembly 10, an edge-relief provided by the stretch gradient via gaps 66, and any padding included in such components, are all arranged to work together to create a functional strap or harness with improved comfort over conventional straps. Disclosed textile assemblies 10 and associated textile straps 12, therefore, may be configured to eliminate or reduce pressure (for example in the axilla or any other sensitive area) and improve load distribution.

Holes 24 may take a variety of shapes, sizes, orientations, placement, arrangement, etc. In some examples, at least some of holes 24 may be elongate holes 24. Additionally or alternatively, holes 24 may be small perforations formed through patterned textile laminate 22. Sample locations and arrangements of holes 24 are schematically represented in FIG. 1 for illustrative purposes, though examples of textile assemblies 10 may include more holes 24, fewer holes 24, differently spaced holes 24, differently sized holes 24, differently shaped holes 24, and/or differently oriented holes 24. As noted above, holes 24 may be configured to modify breathability and/or wicking characteristics of patterned textile laminate 22, while generally having limited or substantially no impact on the mechanical strength of the patterned textile laminate and overall textile assembly 10. Specifically, holes 24 may be formed through patterned textile laminate 22 such that the holes 24 substantially do not increase stretchability of patterned textile laminate 22 where holes 24 are formed.

Gaps 66, on the other hand, are designed to alter an exhibition of stretch experienced by textile assembly 10. Gaps 66 may be positioned within a span 26 of textile assembly 10 where it is desired to create a gradient of varying stretch with gaps 66 being open on at least one side. Gaps 66 may be formed between adjacent fingers, or tabs 74, with one or more respective tabs 74 including one or more respective holes 24 formed therethrough, in some examples. Span 26 also may be referred to herein as a length, breadth, portion, or segment 26 of textile assembly 10. The gradient of varying stretch is effectively created by selecting a sizing, a shape, a spacing, a width, a number of, and a location of gaps 66. Specifically, the spacing between adjacent gaps 66 may be used to allow stretch in textile assembly 10, even though gaps 66 may be formed between tabs 74 formed of a non-stretch or low-stretch patterned textile laminate 22. In other words, gaps 66 may be configured to create a varying stretch profile in textile assembly 10 along, or within, the portion (or portions) of textile assembly 10 which includes gaps 66 (e.g., one or more spans 26), while portions of textile assembly 10 without gaps 66 may have a substantially constant stretch profile dictated by an interaction of patterned textile laminate 22 and textile substrate 14. Thus, holes 24 may be positioned anywhere within textile assembly 10, including within portions of textile assembly 10 where it is desired to have limited stretch or no stretch in textile assembly 10, while gaps 66 may be positioned within portions of textile assembly 10 where it is desired to have increased stretch in textile assembly 10, as compared to the stretch permitted by the material used for patterned textile laminate 22 without said gaps 66 formed therein. Gaps 66 may incidentally improve wicking and/or breathability characteristics of textile assembly 10 as well. Thus, incorporation of holes 24 and gaps 66 in textile assembly 10 may be configured to achieve variable stretch across width 20 of textile assembly 10, as well as improve breathability and wicking for overall textile assembly 10. Sample locations and arrangements of gaps 66 are schematically represented in FIG. 1 for illustrative purposes, though examples of textile assemblies 10 may include more gaps 66 and/or tabs 74, fewer gaps 66 and/or tabs 74, differently spaced gaps 66 and/or tabs 74, differently sized gaps 66 and/or tabs 74, differently shaped gaps 66 and/or tabs 74, and/or differently oriented gaps 66 and/or tabs 74.

Placement of gaps 66 and selection of respective materials for textile substrate 14 and patterned textile laminate 22 as described herein may be configured to create axial contours of stretch that vary between a maximum of stretch dictated by stretch textile substrate 14 (e.g., due to the stretch nature of the materials used for textile substrate 14), and a minimum of stretch dictated by patterned textile laminate 22 (limited by the non-stretch or low-stretch property of the material(s) selected for patterned textile laminate 22, and the way patterned textile laminate 22 is secured to textile substrate 14). Disclosed textile assemblies 10 may be configured to offer high axial stiffness with a high modulus of elasticity that can vary laterally, or across width 20 of textile strap 12, and may be specifically configured to ease the transition from a stretch edge of the strap (e.g., first edge 16) to a section of the strap that is non-stretch, thereby improving comfort for the wearer. In some examples, gaps 66 are configured to result in a textile assembly 10 where a degree of elasticity (e.g., percentage of stretch) in a direction substantially perpendicular to width 20 of textile assembly 10 varies across the width 20 of textile assembly 10 such that the degree of elasticity increases along width 20 towards first edge 16, and such that the degree of elasticity decreases along width 20 of the textile assembly towards second edge 18. In other words, within span 26, the degree of stretch experienced by textile assembly 10 in directions indicated by arrow 30 may be greatest at or near first edge 16, lowest at or near second edge 18, and vary along a substantially continuous gradient between first edge 16 and second edge 18. Of course, gaps 66 may be arranged such that textile assembly 10 experiences the greatest stretch along second edge 18 and little or no stretch along first edge 16 in other examples. In yet other examples, gaps 66 may be arranged such that textile assembly 10 experiences maximal stretch along both first edge 16 and second edge 18, with minimal stretch near a middle, or centerline, or textile assembly 10. In yet other examples, gaps 66 may be arranged to create a plurality of local minima and/or maxima of degrees of stretch, and/or to vary the degree of stretch along the length of textile assembly (or along another direction or dimension), rather than across width 20. Generally, gaps 66 may be placed in locations where it is desired to create pressure relief along or near one or more edges of textile strap 12, and/or to prevent edge effects in textile strap 12 (e.g., prevent the edge(s) from digging in to the wearer's body when textile strap 12 is used to transfer a weight or load to the wearer's body, or for areas of the wearer's body which must be free to move), with said locations varying depending on the specific application textile strap 12 is intended for.

For example, in the case of textile strap 12 used in a prosthetic upper limb harness, key areas of loading of textile strap 12 against the wearer's body may be an area where textile strap 12 passes under the sound side arm, particularly on a superior edge of the strap. Presently disclosed textile assemblies 10 may be configured to provide increased comfort and pressure relief along, for example, first edge 16 of textile substrate 14 within span 26, yet still be configured to maintain integrity of textile strap 12 and prevent significant deformation or collapse of textile strap 12 under loading. In some examples, this may be accomplished by limiting the span 26 in which the stretch gradient is provided via the gaps. Thus, rather than providing a gradient of stretch along the entire textile strap 12, only a limited portion of the textile strap may be configured to provide pressure relief along the edge, corresponding to the key areas of the strap where pressure relief would be most needed. The technical effect of creating variable lateral stiffness as disclosed herein is that as much of the width of textile strap 12 is in contact with the wearer's body as possible when textile strap 12 is under tension. While conventional straps often bunch up along one edge due to being pulled away from contact with the wearer's body, the use of the stretch gradient in presently disclosed textile assemblies 10 may provide improved contact between textile strap 12 and the wearer's body, with first edge 16 stretching and remaining in contact with the wearer's body, thereby distributing the load across as much of width 20 of textile strap 12 as possible.

In some examples, gaps 66 may be formed in portions of patterned textile laminate 22 that extend from holes 24, such as from one or more rows of holes 24. A far end 40 of patterned textile laminate 22 that is farthest away from second edge 18 may be spaced apart from first edge 16 within span 26. In other words, at least within span 26 (where gaps 66 are present), patterned textile laminate 22 may be narrower than width 20 of textile substrate 14, such that textile substrate 14 extends beyond far end 40 of patterned textile laminate 22, at least within span 26. Stated another way, patterned textile laminate 22 may be said to stop short of first edge 16 and/or second edge 18 of textile substrate 14. FIG. 1 shows far end 40 of patterned textile laminate 22 being spaced apart from first edge 16, while other portions of patterned textile laminate 22 are substantially coextensive with second edge 18; though in other examples of textile assembly 10, far end 40 of patterned textile laminate 22 is spaced apart from second edge 18, while other portions of patterned textile laminate 22 may be substantially coextensive with first edge 16.

Textile assemblies 10 may include stitching 34 that repeatedly passes through textile assembly 10 and may serve to couple one or more components of textile assembly 10 together, reinforce the one or more components of textile assembly 10, and/or limit stretch in one or more regions of textile assembly 10. For example, stitching 34 may be configured to couple patterned textile laminate 22 to stretch textile substrate 14. In a specific example, stitching 34 may be Kevlar® thread, though other materials may be used for stitching 34. Stitching 34 may axially follow a plurality of contour lines of textile assembly 10 and limit, prevent, and/or reduce stretch along said contour lines. Additionally or alternatively, stitching 34 may follow a respective gap perimeter 36 of each respective gap 66, and/or a respective hole perimeter 38 of one or more holes 24. In some examples, stitching 34 may be formed with a single continuous path throughout textile assembly 10. In examples of textile assembly 10 where patterned textile laminate 22 includes a woven material that follows a curved contour or complex shape, this may result in areas where a bias of a weave of the woven material is not oriented correctly to restrict stretch. In these cases, stitching 34 may be placed to overcome any undesired mechanical stretch from such woven materials used in patterned textile laminate 22. In some examples, stitching 34 and patterned textile laminate 22 may function together to serve similar purposes as conventional straps and webbing materials, yet with breathability not usually available in conventional straps and webbing.

Additionally or alternatively, stitching 34 may cross over the interior of one or more holes 24, imparting non stretch characteristics to the breathable and wicking interior (i.e., textile substrate 14) of one or more holes 24, despite the absence of woven or other material in patterned textile laminate 22 in the interior of such a hole 24. In some examples, stitching 34 may be formed with a single continuous path throughout textile assembly 10. In examples of textile assembly 10 where patterned textile laminate 22 includes a woven material that follows a narrow curved contour or complex shape, this may result in areas where no material at all in textile laminate 22 is present, in order to preserve wicking and/or breathability. In these cases, stitching 34 may be placed to overcome any undesired stretch from the absence of such woven materials used in patterned textile laminate 22. In some examples, stitching 34 and patterned textile laminate 22 may function together to serve similar purposes as conventional straps and webbing materials, yet with breathability not usually available in conventional straps and webbing.

As noted above, textile substrate 14 is generally formed of a stretch, or elastic, material (e.g., stretch fabrics or other textiles). As used herein, the term "textile" is non-limiting and is an umbrella term intended to include various fiber-based materials, including fibers, yarns, filaments, threads, and different fabric types (which may be knit, woven, or non-woven, in various examples). The term "textile" may be used interchangeably with the term "fabric" herein. Examples of suitable, but non-limiting, textiles and other materials for components of disclosed prosthetic devices are provided throughout this disclosure, though those of ordinary skill in the art will appreciate that a variety of textiles and/or other materials may be used to accomplish the technical effects described herein. In some examples, textile substrate 14 is a four-way stretch material, such as a spacer mesh material, though many other different materials are suitable for use as textile substrate 14, including but not limited to neoprene, scuba knit polyspan, or any other stretch breathable material. In some examples, the material used for textile substrate 14 may have a 3D-mesh structure that may effectively add small amounts of padding across width 20 of textile substrate 14. Generally, however, it is preferable for textile substrate 14 to exhibit breathability and moisture-wicking properties.

While each of the major components of textile assembly 10, including textile substrate 14, textile laminate 22, outer shell 60, or any of their sub components such as stitching 34 may be separately constructed and assembled as in the described examples, it is also possible through other manufacturing techniques, such as engineered knitting, to manufacture the functional equivalent of each of these respective components in place, arranged in three dimensions, using materials of different properties and configurations, to achieve the same functional effects as completed textile assembly 10. In this way, for example, a complete engineered knit prosthetic or climbing harness may be constructed with the desired functional properties of limited stretch for function and safety, edge relief for comfort and freedom of movement, maximum breathability and wicking. Such a device may be manufactured on a single machine with minimal labor and waste of material, maximizing all of the functional benefits of the completed assembly. A complete garment containing the functional elements of textile assembly 10 may be constructed with those elements in the proper functional locations with respect to the body of the wearer, e.g. a stretch knit t-shirt containing a functional integrated prosthetic harness may be constructed.

With primary reference to FIG. 2, which shows a schematic cross-sectional view of a portion of examples of a textile assembly 10, textile substrate 14 may have a first side 42 and a second side 44 opposite first side 42. First side 42 may be configured to face away from a wearer's body when textile assembly 10 is worn. Similarly, second side 44 may be configured to face and engage with the wearer's body when textile assembly 10 is worn. As used herein, a textile assembly 10 is said to be engaged with a wearer's body whether or not clothing is present between the textile assembly 10 and the wearer's body.

Patterned textile laminate 22 may be a single-layer laminate, or may be a laminate formed of multiple layers and/or coatings. Patterned textile laminate 22 may include a woven material and/or may include waterproof materials. When woven materials are used, the warp/weft may be aligned oppositely in each piece or layer to limit mechanical stretch in any direction, due to geometry of the weave. Patterned textile laminate 22 may be formed from multiple layers of non-stretch or low-stretch material or materials such as nylon, cotton cordura, and/or ripstop materials (e.g., ripstop cotton). The non-stretch or low-stretch components of patterned textile laminate 22 may be selected to have sufficient tensile strength in multiple directions and to be capable of maintaining these properties despite perforation for pressure relief and breathability (e.g., despite holes 24 and gaps 66), and for compatibility with any sheet glue materials used to bond the layers of patterned textile laminate 22 together. The sheet glue materials may be selected to be stiff enough and resistant to creasing and deformation such that the sheet glue materials are configured to maintain the shape of textile strap 12 and help prevent collapse on loading.

Patterned textile laminate 22 may be bonded to textile substrate 14, and/or patterned textile laminate 22 may be sewn to textile substrate 14 via stitching 34. In some examples, materials may be selected for patterned textile laminate 22 that have a relatively high melting temperature, so as to avoid being melted during steps of forming the textile assembly, such as heat-pressing layers together. In a specific example, patterned textile laminate 22 may be formed of nylon 48 and/or a PVC coating 50. For example, as shown in FIG. 2, patterned textile laminate 22 may include a first layer 49 of PVC-coated nylon and a second layer 51 of PVC-coated nylon, arranged with respect to one another such that a first PVC side 56 of first layer 49 faces a second PVC side 58 of second layer 51. A first nylon side 52 of first layer 49 may be arranged to face away from textile substrate 14, while a second nylon side 54 of second layer 51 may be arranged to face and/or contact textile substrate 14. First layer 49 and second layer 51 may be bonded together such that the respective PVC coatings 50 of patterned textile laminate 22 face each other, while the respective nylon layers 48 sandwich the PVC coatings 50 therebetween.

Materials are selected for textile assembly 10 such that textile assembly 10 is configured to conform to the body of the wearer of textile assembly 10. Textile assemblies 10 may be incorporated into textile straps 12, which may additionally include one or more straps, buckles, and/or padding for securing textile strap 12 to the body of the wearer, securing a load to textile strap 12, and/or for comfort of the wearer, as described herein and as is understood in the art. Additionally or alternatively, textile assemblies 10 may include an anti-odor treatment, layer, or coating, such as a silane and/or silver treatment, coating, or layer. Such anti-odor treatments can be added to completed textile assemblies 10 (e.g., by rinsing or dipping), or added to or incorporated into individual fabrics or materials used to construct textile assembly 10 and/or textile strap 12.

When textile assemblies 10 are incorporated into textile strap 12, said textile strap 12 may include an outer shell 60 encasing or at least partially surrounding textile assembly 10. At least part of outer shell 60 may be formed of a four-way stretch material. For example, outer shell 60 may include an inner side, or inner layer 64, configured to face the body of the wearer when textile strap 12 is worn. Inner layer 64 may be formed of, for example, a knit polyspan such as spandex or Lycra®, polyester, or other knit fabrics, which sometimes may be referred to as "polyspan" (not to be confused with the nonwoven tissue of the same name). Additionally or alternatively, inner layer 64 may be formed from a cool touch fabric to improve heat management of textile assembly 10. Outer shell 60 may include an outer side, or outer layer 62, which is generally configured to face away from the body of the wearer when textile strap 12 is worn. Outer layer 62 may be formed of a stretch material such as a stretch woven material. In some examples, material(s) selected for outer layer 62 may be selected to impart durability (e.g., wear and abrasion resistance) to textile strap 12. Additionally or alternatively, outer shell 60, or at least a portion thereof, may be water vapor permeable, non-slip (e.g., may create a sufficient amount of friction with the wearer's body or intervening clothing to help keep textile assembly 10 in place on the wearer's body), and/or moisture-wicking.

Inner layer 64 and outer layer 62 may be arranged opposite one another and bonded and/or sewn together, such as along respective joints along first edge 16 and second edge 18 of textile substrate 14. In this manner, layers 62, 64 of outer shell 60 may be secured such that outer shell 60 surrounds and encompasses textile assembly 10 within a channel of outer shell 60. In some examples, seams are sewn along the joint between outer layer 62 and inner layer 64, and then outer shell 60 may be inverted such that the seams are positioned within the channel of outer shell 60, rather than visible on the outer layer In some examples, textile assembly 10 may be configured to slide within the channel of outer shell 60 (e.g., textile assembly 10 may be configured to slide, or be laterally translated, with respect to inner layer 64 and/or outer layer 62). In some examples, textile assembly 10 may be coupled to inner layer 64 and/or outer layer 62 of outer shell 60. In a specific, non-limiting example, at least a portion of outer layer 62 of outer shell 60 is free from direct coupling to textile assembly 10, while at least a portion of inner layer 64 is directly coupled to textile assembly 10. For example, in some such examples, textile assembly 10 includes a stretch glue layer 46, such as a stretch adhesive film, that may serve to bond or adhere textile substrate 14 to an inner layer 64 of outer shell 60. Stretch glue layer 46 is perforated in some examples, and is generally configured to maintain, or avoid interfering with, the stretch properties created by textile substrate 14 and gaps 66. In some examples, stretch glue layer 46 is breathable, such as a perforated breathable sheet glue (suitable examples may be obtained from Bemis Associates Inc.).

In FIGS. 3-22, illustrative, non-exclusive examples of textile assemblies 10 and/or textile straps 12 including the same are illustrated. Where appropriate, the reference numerals from the schematic illustrations of FIGS. 1-2 are used to designate corresponding parts of FIGS. 3-22; however, the examples of FIGS. 3-22 are non-exclusive and do not limit textile assemblies 10 or textile straps 12 to the illustrated examples of FIGS. 3-22. That is, textile assemblies 10 and textile straps 12 are not limited to the specific examples illustrated in FIGS. 3-22 and may incorporate any number of the various aspects, configurations, characteristics, properties, etc. of textile assemblies 10 and textile straps 12 that are illustrated in and discussed with reference to the schematic representations of FIGS. 1-2 and/or the examples of FIGS. 3-22, as well as variations thereof, without requiring inclusion of all such aspects, configurations, characteristics, properties, etc. For the purpose of brevity, each previously discussed component, part, portion, aspect, region, etc. or variants thereof may not be discussed, illustrated, and/or labeled again with respect to each of FIGS. 3-22; however, it is within the scope of the present disclosure that the previously discussed features, variants, etc. may be utilized therewith.

Figure 3:
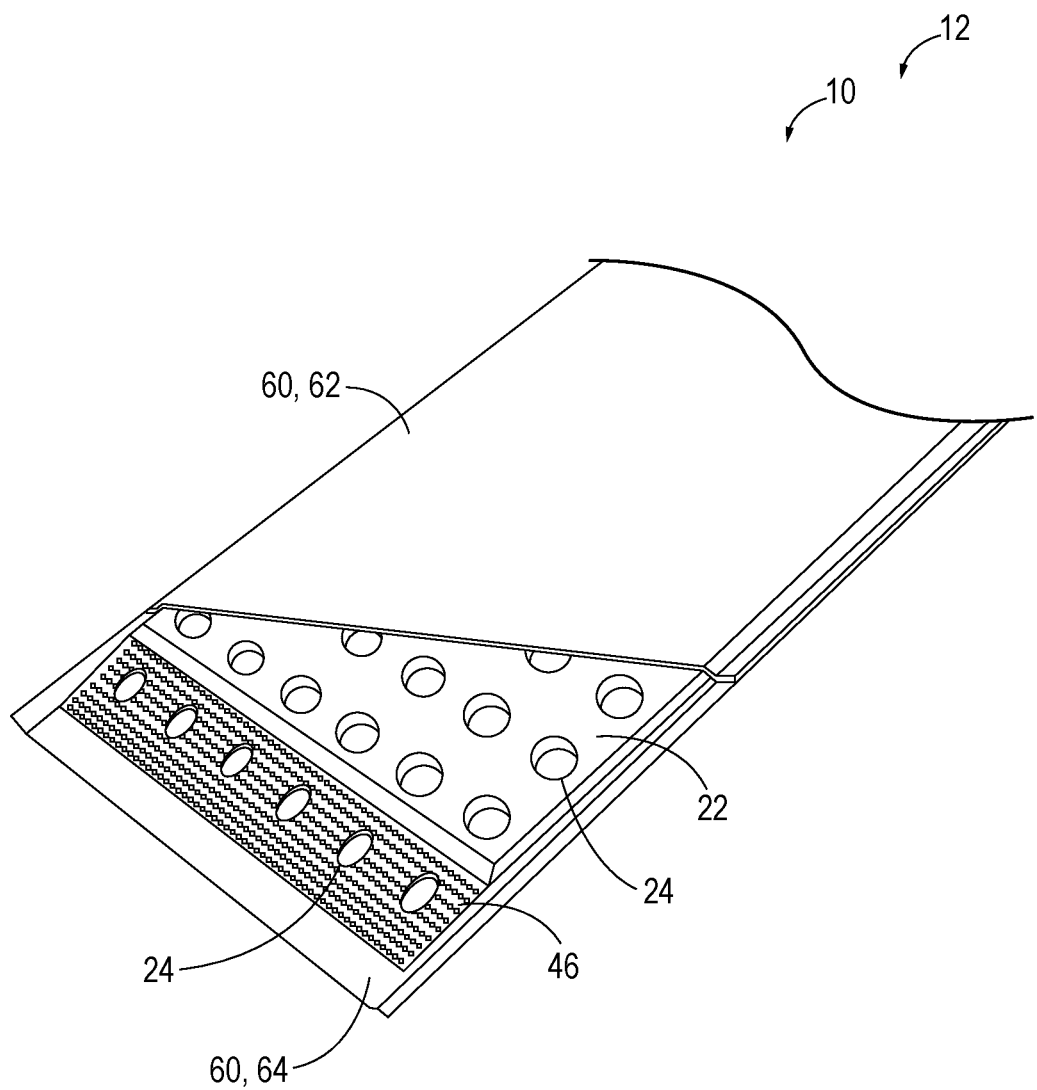
FIG. 3 is a partial cutaway view of an example of a textile assembly according to the present disclosure.

FIG. 3 shows a partial cutaway view of one example of textile strap 12 including textile assembly 10. In the example of FIG. 3, inner layer 64 and outer layer 62 of outer shell 60 are shown, with outer shell 60 being formed of athletic knit and woven fabrics. Patterned textile laminate 22 has an array of round holes 24 formed therethrough, and is made of cordura nylon in this example. Stretch glue layer 46, in the form of a hotmelt, serves to bond inner layer 64 of outer shell 60 to patterned textile laminate 22. As shown in FIG. 3, stretch glue layer 46 may include holes 24 formed therethrough as well. Inner layer 64 of outer shell 60 may be a knit material with a grip surface, and may include a cool touch surface.

Figure 4:
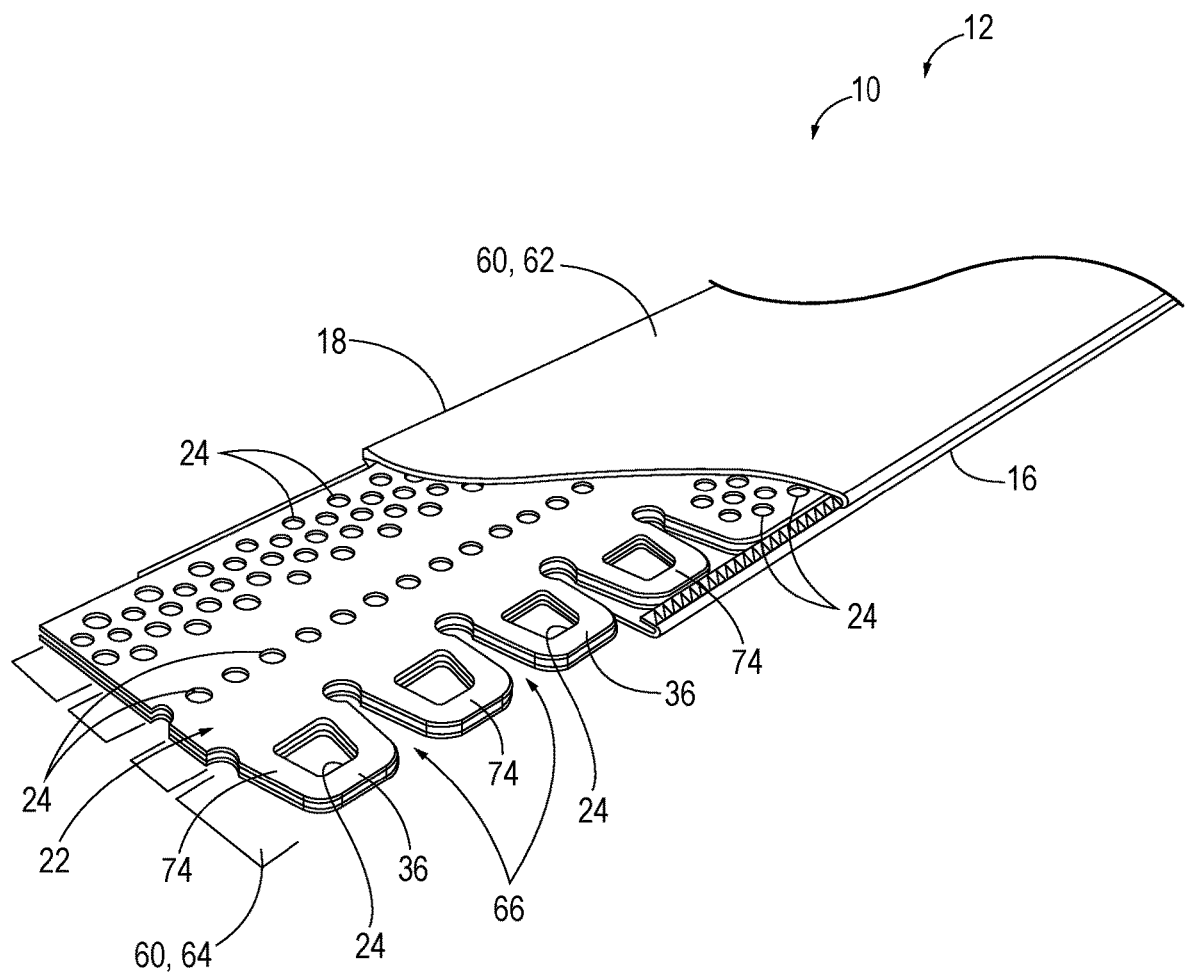
FIG. 4 is a partial cutaway view of an example of a textile assembly according to the present disclosure.

FIG. 4 shows another partial cutaway view of another example of textile strap 12 and textile assembly 10. In the example of FIG. 4, patterned textile laminate 22 includes holes 24 and gaps 66 formed therethrough. Each adjacent pair of tabs 74 is spaced apart by a respective space or gap 66. As shown in FIG. 4, gaps 66 may be positioned adjacent first edge 16 and open towards first edge 16, though gaps 66 are spaced apart from first edge 16 in other examples.

Figure 5:
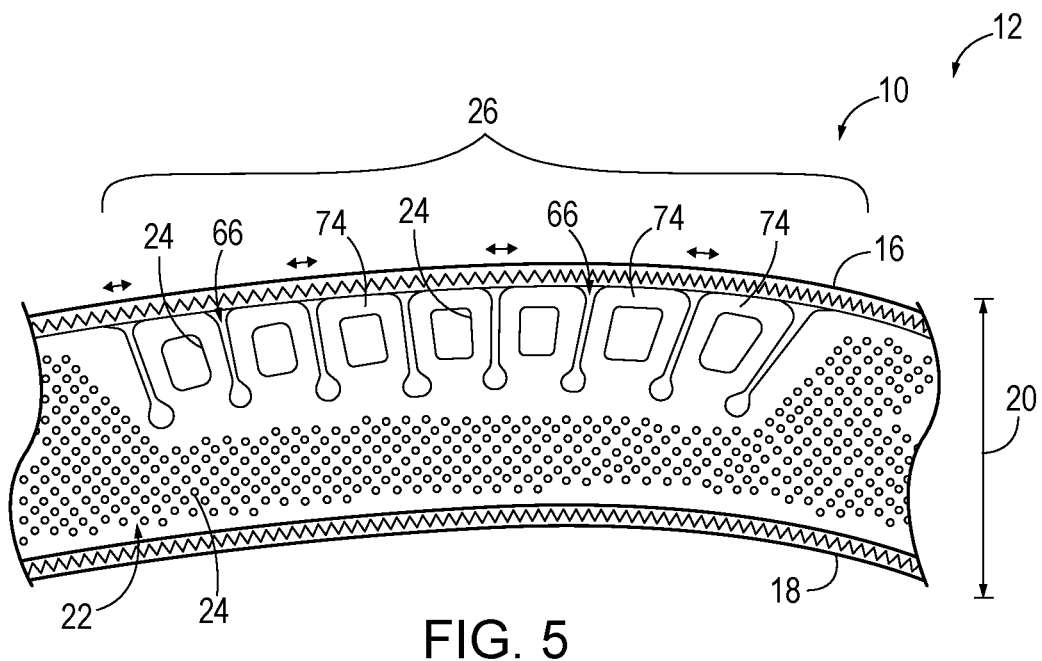
FIG. 5 is an elevation view of a portion of a textile assembly according to the present disclosure, shown in an unflexed configuration.
Figure 6:
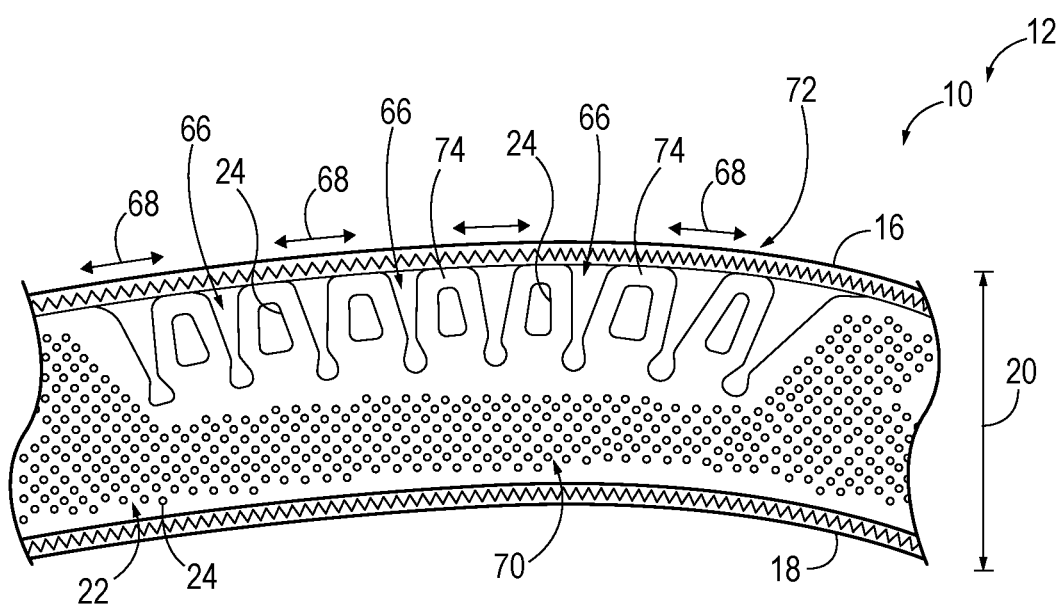
FIG. 6 is an elevation view of the portion of the textile assembly of FIG. 5, shown in a flex, or stretched, configuration.

FIGS. 5-6 demonstrate two examples of textile assembly 10, which may have two different gradients of stretch between first edge 16 and the center of textile strap 12, based on the configuration of gaps 66, when either configuration of strap is stretched along a longitudinal axis of the textile assembly, or stretched perpendicularly to a width 20 of the textile assembly). In either configuration, first edge 16 stretches such that tabs 74 are separated apart from one another, moving textile assembly 10 to a flexed configuration. As tension is released, tabs 74 move closer together towards the unflexed configuration. In the configuration shown in FIG. 5, respective gaps 66 between adjacent respective tabs 74 are relatively small, and adjacent pairs of gaps are spaced close to one another, thereby limiting the gradient of stretch allowed or creating no gradient of stretch. In the second configuration shown in FIG. 6, tabs 74 vary in width across the width of textile strap 12, creating a gradient of longitudinal stretch across width 20 of textile strap 12. Gaps 66 and a portion of patterned textile laminate 22 forming a respective perimeters 36 of respective gaps 66 may be said to form the tabs, or fingers, 74 that spread out to accommodate stretch of textile assembly 10 along first edge 16 in this example, with gaps 66 being configured to allow adjacent tabs 74 to spread apart from one another when textile assembly 10 is stretched. Thus, in the configuration illustrated in FIG. 6, textile assembly 10 exhibits stretch substantially along its longitudinal axis along first edge 16, while second edge 18 is substantially unstretched, due to the absence of gaps 66 along second edge 18 and the use of a non-stretch or low-stretch material for patterned textile laminate 22, which limits the stretch of textile assembly 10 along second edge 18 because of the coupling of patterned textile laminate 22 to other components of textile assembly 10. It may be said that textile assembly 10 has a stretch zone 72, as illustrated in FIG. 6, corresponding to one or more areas of stretch during tensile loading, with stretch zone 72 configured to provide pressure relief along first edge 16, and a non-stretch zone 70 where textile assembly 10 generally exhibits a low degree of stretch, or no stretch. A gradient of stretch may be created between stretch zone 72 and non-stretch zone 70, via gaps 66, wherein allowable motion in a respective zone may be varied by varying a kerf between the non-stretch portions in patterned textile laminate 22.

Figure 7:
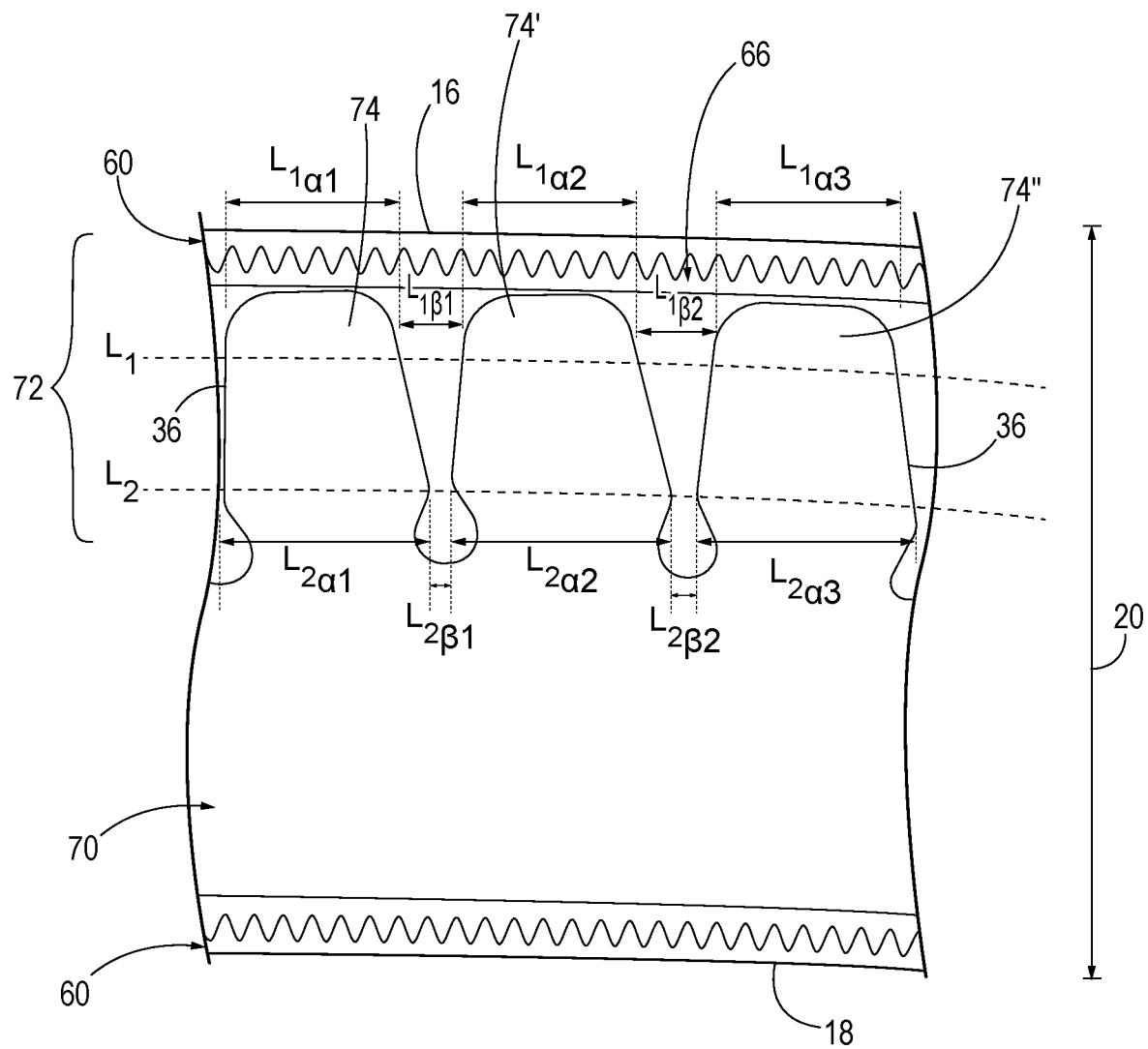
FIG. 7 is a plan view of a portion of an example of presently disclosed textile assemblies, illustrating a calculation of a percent, or degree, of stretch along a contour line within a gradient.

FIG. 7 shows a partial close-up, cutaway view illustrating a calculation of the percentage stretch possible along linear contours of varying distances from the center of textile assembly 10 across gaps 66 between different portions of respective adjacent tabs 74. While tabs 74 of stretch zones 72 of textile assemblies 10 may include holes 24, in some examples, stretch zones 72 may be created using tabs 74 (also referred to herein as pressure relief tabs 74) without holes 24. Specifically, FIG. 7 shows a close-up of a sample stretch zone 72 for pressure relief. If non-stretch zone 70 along second edge 18 has a stretch of $\alpha=0\%$ and stretch zone 72 has a stretch (four-way) of $\beta=40\%$, the stretch across a contour line within stretch zone 72 can be calculated, or predicted, by measuring the percentage of the length of the contour line L that crosses each zone 70, 72. For example, FIG. 7 shows contour lines $L_1$ and $L_2$, across pressure-relief tabs 74 in stretch zone 72. The stretch along contour line $L_1$, then, is given by the stretch of the textile element ($\beta$) multiplied by the percentage of contour line $L_1$ through stretch zone 72 that transits the textile element, or:

$$\beta \times \sum_{i=1}^{n} \frac{L_{1\beta_i}}{L_{1\beta_i} + L_{1\alpha_i}} = \beta \frac{L_{1\beta_1} + L_{1\beta_2} + \cdots L_{1\beta_n}}{L_{1\beta_1} + L_{1\beta_2} + \cdots L_{1\beta_n} + L_{1\alpha_1} + L_{1\alpha_2} + \cdots L_{1\alpha_n}}$$

In the equation above, $L_{1\alpha 1}$ is the length of the portion of contour line $L_1$ that extends across tab 74, $L_{1\alpha 2}$ is the length of the portion of contour line $L_1$ that extends across tab 74', $L_{1\alpha 3}$ is the length of the portion of contour line $L_1$ that extends across tab 74", and so on. Similarly, $L_{1\beta 1}$ is the length of the portion of contour line $L_1$ that extends across gap 66 between tabs 74 and 74'. $L_{1\beta 2}$ is the length of the portion of contour line $L_1$ that extends across gap 66 between tab 74' and 74", and so on. The percent stretch along a given contour line can be calculated according to the formula shown, such that contour lines may have a substantially constant degree of stretch along the contour line. Disclosed textile assemblies 10 may be configured such that contour lines follow a curve of the wearer's body, a curve of the overall three dimensional shape of textile assembly 10 or textile strap 12, and/or the longitudinal axis of textile assembly 10 at various points between first edge 16 and second edge 18. In this manner, zones of any design that have requirements for stretch or non-stretch regions may be defined, and any desired gradient in these properties may be mapped out in a two dimensional pattern of gaps 66 between tabs 74 in patterned textile laminate 22. Each proposed geometrical configuration of internal layers of textile assembly 10 (e.g., stretch textile substrate 14 and patterned textile laminate 22) can then be evaluated using this method to ensure that it performs to the required specification. In other words, for a desired degree or percentage of stretch in an area of textile assembly 10, angles and widths of gaps 66 and a size of tabs 74 therebetween may be determined to result in the desired stretch characteristics of textile assembly 10.

FIGS. 8-10 illustrate three examples of different design geometries that yield different loading and load relief characteristics. FIG. 8 shows an examples of textile strap 12 with a pressure-relief stretch zone 72 along both first and second edges 16, 18, while FIG. 9 shows an example of textile strap 12 with a stretch zone 72 along first edge 16 but not second edge 18. As described above, the stretch across a contour line can be calculated by multiplying the ratio (0.375, in this example) of the lengths of stretch to non-stretch crossed by the given contour line to the percentage stretch of the stretch textile component such as textile substrate 14 ($\beta=40\%$) giving:

$$0.40 \times \frac{L_{1\beta_1} + L_{1\beta_2} + \cdots L_{1\beta_n}}{L_{1\beta_1} + L_{1\beta_2} + \cdots L_{1\beta_n} + L_{1\alpha_1} + L_{1\alpha_2} + \cdots L_{1\alpha_n}} = 0.40 \times 0.375 = 0.15$$

If the stretch of the textile component is two-way, or four-way with differing stretch coefficients, the calculation can be completed by using the horizontal and vertical components of each segment, and separately predicting or calculating the contribution of each stretch direction and stretch coefficient in order to arrive at the stretch for each contour. The example of FIG. 8 Illustrates the varying degrees of stretch of respective contour lines to create a stretch gradient across width 20 of textile assembly 10. For example, the degree of stretch along contour line $L_1$ is 40%. The degree of stretch in this example decreases moving from first edge 16 towards the centerline, and increases again moving from the centerline towards second edge 18. In this specific example, the degree of stretch along contour line $L_2$ is 15%, the degree of stretch of contour line $L_3$ is even less, at 8%, and the degree of stretch along the centerline $L_4$ is 0%. The stretch then increases again while moving away from centerline $L_4$ towards second edge 18, with contour line $L_5$ having a degree of stretch of 8%, contour line $L_6$ having a degree of stretch of 15%, and contour line $L_7$ along second edge 18 having a degree of stretch of 40%. While the stretch gradient of the example of FIG. 8 is symmetrical on either side of centerline $L_4$, other examples of textile assemblies 10 are not limited to the same. Similarly, while the stretch in all of these examples is constant across each contour line, other examples of textile assemblies 10 could include gradients of stretch in the longitudinal direction of individual contours over the length of textile strap 12, in addition to or instead of transverse gradients between the respective edges 16 and 18.

In the example of FIG. 9, the degree of stretch decreases from 40% along first edge 16 to 0% along contour line $L_4$ (e.g., the centerline of textile assembly 10), with all of the contour lines between the centerline and second edge 18 (e.g., contour lines $L_5$, $L_6$, and $L_7$) having a degree of stretch of 0% (e.g., are non-stretch). As seen in the example of FIG. 9, tabs 74 and gaps 66 are formed in the portion of textile assembly 10 between centerline (L₄) and first edge 16, while patterned textile laminate 22 does not include any gaps 66 or tabs 74 in this example between centerline (L₄) and second edge 18. Thus, the stretch gradient created in this example is substantially constant on the portion of textile assembly between the centerline and second edge 18, and increases across width 20 from the centerline to first edge 16.

In the example of FIG. 10, the gradient of stretch increases from 0% adjacent second edge 18 to 40% along first edge 16, with the degree of stretch increasing as distance from the second edge increases. To create this pressure relief profile, gaps 66 and tabs 74 extend across a significant portion of width 20 of textile assembly 10, to effectively create a varying degree of stretch across almost all of width 20. By adding these zones 72 of stretch gradient to a design, loads may be borne more comfortably by distributing it over a larger area, and easing the transition at one or both edges 16, 18.

Figure 11:
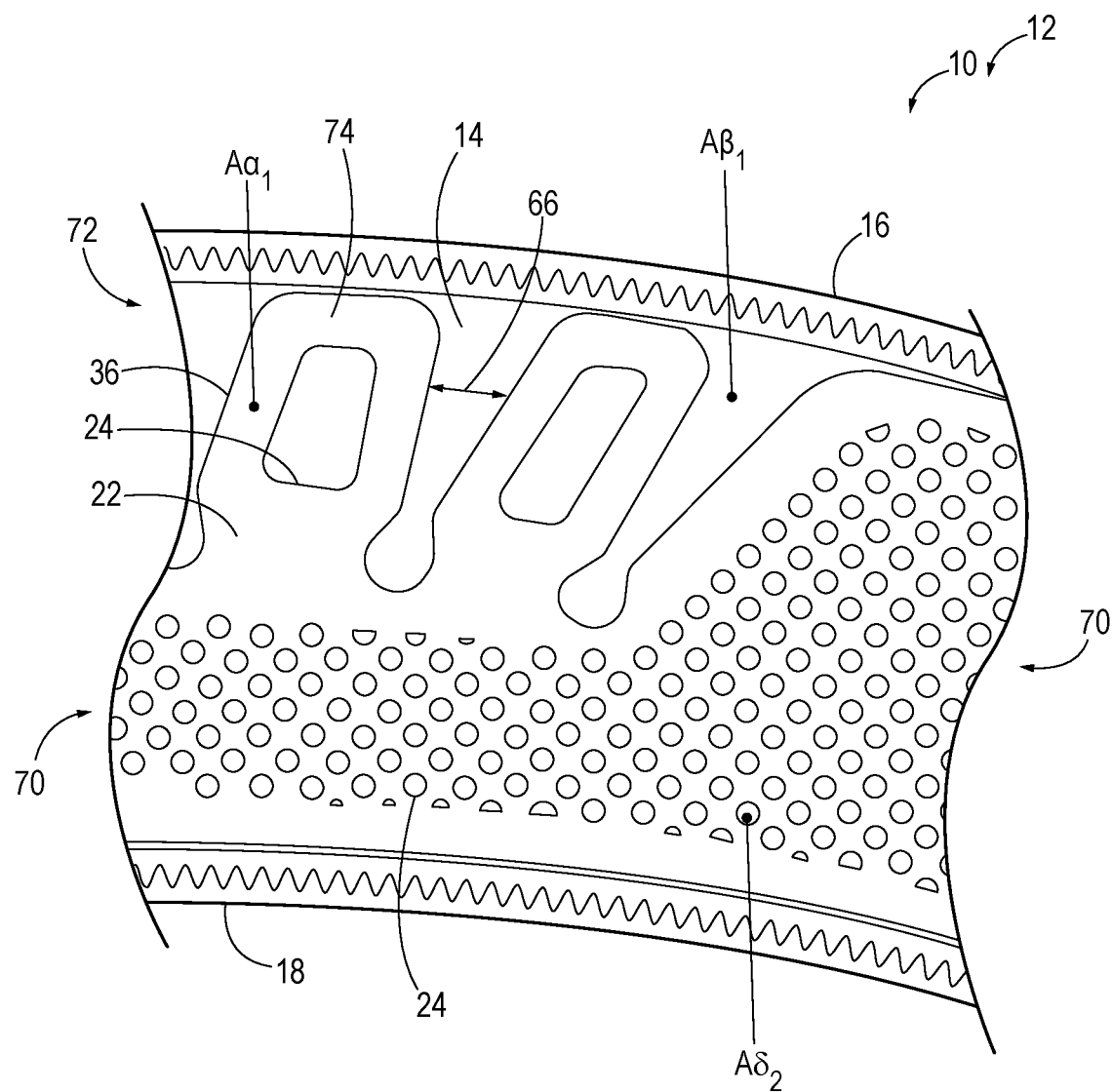
FIG. 11 is a detail view of a section of an example of presently disclosed textile assemblies, showing a border between a variable stretch zone and a non-stretch zone.

FIG. 11 shows a detail of a section of an example of textile strap 12, showing the border between an example of variable stretch zone 72 and an example of non-stretch zone 70. Perforations (e.g. holes 24) of patterned textile laminate 22 allow wicking and breathability of the textile strap 12. The breathability (B) of the textile assembly can be calculated according to the formula shown below, where the relative area of the breathable portions of the assembly is multiplied by the breathability of that component, yielding the amount of water vapor that the assembly is capable of transporting through the assembly in 24 hours. This could be modified to account for any number of zones of breathability by applying the same formula to each breathability zone. In the following equation, $A_\alpha$ corresponds to an area of the non-breathable portions of the assembly, and $A_\beta$ and $A_\delta$ correspond to the breathable portions of the assembly. For example, $A_{\beta 1}$ corresponds to an area of a respective gap 66, and $A_{\delta 2}$ corresponds to an area of any respective hole 24.

$$B1_{component} = B1_{textile} \times \sum_{i=1}^{n} \frac{A_{\beta i} + A_{\delta i}}{A_{\beta i} + A_{\alpha i} + A_{\delta i}} = \frac{A_{\beta 1} + A_{\beta 2} + \cdots A_{\beta n} + A_{\delta 1} + A_{\delta 2} \cdots A_{\delta n}}{A_{\beta 1} + A_{\beta 2} + \cdots A_{\beta n} + A_{\alpha 1} + A_{\alpha 2} + \cdots A_{\alpha n} + A_{\delta 1} + A_{\delta 2} \cdots A_{\delta n}}$$

The breathability of a garment or accessory can thus also be calculated using the geometrical dimensions of the component materials. The breathability of any embodiment of this invention depends on that of the selected external layers used for outer shell 60, and can be calculated for the overall textile strap 12 by multiplying the overall breathability of each layers by the ratio of the total area of exposed stretch material (breathable) and non-stretch (non-breathable) components of the two-dimensional pattern. In contrast, the total area of pressure relief or stretch gradient zones may include areas of both stretch and non-stretch materials. Non-stretch zones 70 can be perforated with holes 24 in such a way as to attempt to preserve their resistance to stretch, but yet achieve breathability through holes 24. Garment fabric breathability is most frequently quantified for waterproof (and non-stretch) breathable fabrics, using the results of the B1 and A1 tests, as understood by those of ordinary skill in the art. Non-waterproof fabrics are generally tested with B1. Either is expressed in grams of water vapor per square meter (or inch) per 24 hours, or g/m2/24 h (g/in2/24 h). Therefore, the mass of water vapor that can be transported by a garment or accessory can be approximated as the 24-hour water vapor mass transport per square meter of the textile multiplied by the ratio of that textile to the total of the textile strap 12.

As long as the properly chosen outer shell 60 materials are unobstructed by the inner layers of textile assembly 10 and have the desired property, wicking can be preserved in the same areas. Wicking in a garment or accessory designed to be worn during physical activity is not generally quantified by the industry except in a binary way: a material is considered to be wicking, or it is not. In practice, some materials perform much better than others, and this must be evaluated for a specific application. In general, this property is directional, can be found in stretch fabrics, and may be preserved in the final assembly. This can be accomplished as long as it is available in the fabric chosen for outer shell 60 in the chosen direction of the textile assembly, and as long as the areas or percentage of area required by application to be wicking can be avoided by areas of patterned textile laminate 22. Because wicking is generally not quantified, a trial and error method may be required for evaluation. If additional wicking is determined to be required in any particular area, it can be added by exposing one or more textile layers or by removal of portions of textile assembly 10. If textile assembly 10 and/or textile strap 12 is constructed in a single step through engineered knitting, some of the unintended limitations of having to use complete full width layers of glue or fabric can be avoided, for example by creating large voids in a knit layer.

Figure 12:
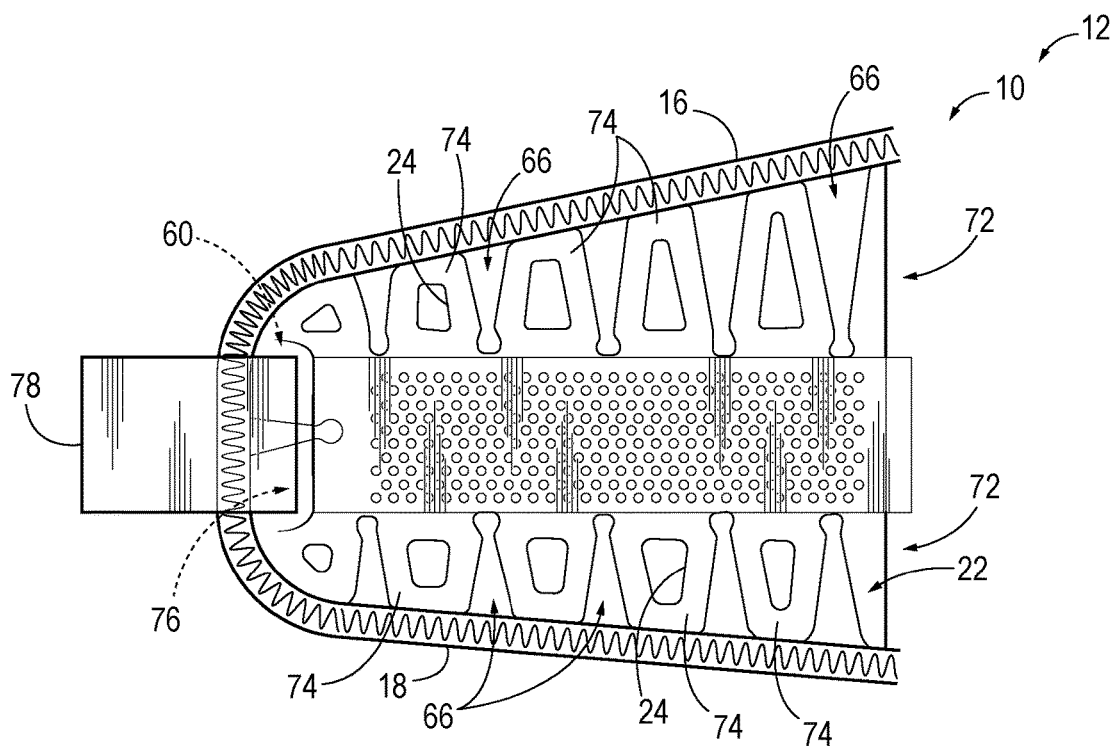
FIG. 12 is an elevation view of an example of disclosed textile assemblies, including a strap or a belt operatively coupled to the textile assembly.
Figure 13:
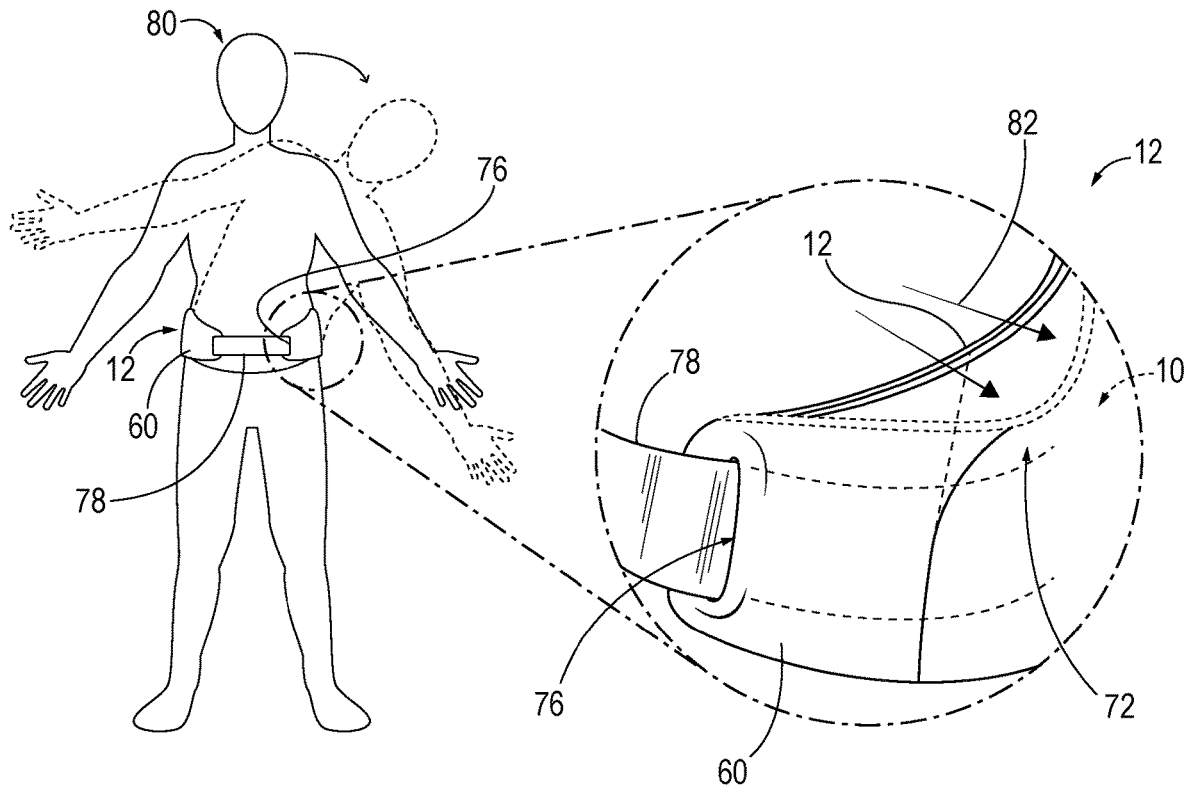
FIG. 13 is a schematic representation of an example of disclosed textile assemblies, in the form of a hip belt.

FIG. 12 illustrates a portion of another example of textile strap 12, shown without outer shell 60. In the example of FIG. 12, gaps 66 are present along both first edge 16 and second edge 18 of textile assembly 10. A strap or webbing 78 may be partially contained within a channel 76 of outer shell 60, which may be configured to secure textile assembly 10 to a wearer's body. FIG. 13 schematically represents an example of textile strap 12 in the form of a hip belt, positioned on a wearer 80. Strap or webbing 78 is visible across the front of the wearer's body, with stretch zone 72 positioned to accommodate movement by wearer 80. For example, wearer 80 is standing upright in a first position (solid lines), and bent to the side in a second position (dashed lines). When wearer 80 moves in this manner, the body pushes outwardly on textile strap 12, causing stretch zone 72 to stretch to accommodate the movement of wearer 80. In the enlarged callout of FIG. 13, the position of textile strap 12 when wearer 80 is upright is show in solid line, while when wearer is in the second, bent position, textile strap 12 stretches outwardly (e.g., along arrows 82), with the stretched or flexed position of textile strap 12 shown in dashed lines.

Figure 14:
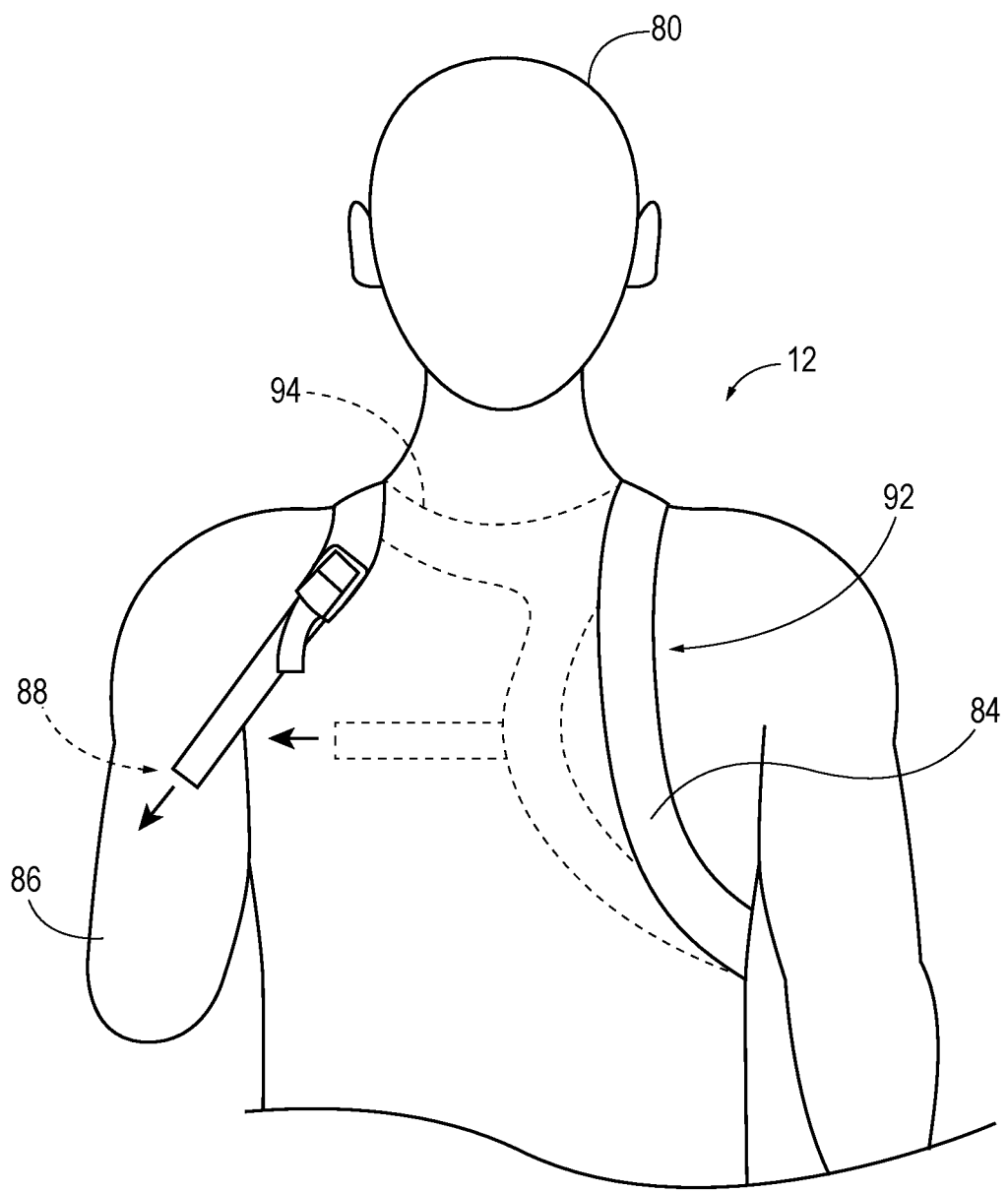
FIG. 14 is a schematic representation of an example of disclosed textile assemblies, shown incorporated into an example of a harness for securing a prosthetic upper limb to a wearer, viewed from an anterior side.

Disclosed textile assemblies 10 and textile straps 12 may be configured to comfortably manage the transition of loading under an area of wearer 80 covered by said textile strap 12 via eliminating the sharp transition of loading at the edge of the textile strap via varying degrees of stretch across the width of textile strap 12 as discussed herein. Disclosed textile straps 12 may be configured to stretch most in any desired area, at any edge for example, and progressively stretch less in any desired direction, smoothly transitioning to a region without any stretch at all. As noted, disclosed textile assemblies 10 and textile straps 12 may be used in a variety of different applications, such as various types of belts, straps, and harnesses. FIG. 14 illustrates an example of textile strap 12 in the form of a harness 84 for securing a prosthetic limb to wearer 80. Similar harnesses consisting of belts or thigh straps may be used for the attachment of some lower limb prostheses. Harness 84 may be coupled to a prosthetic device, such as a prosthetic arm (not shown in FIG. 14) and configured to reinforce securement of the prosthetic device to a residual limb 86 of wearer 80. In some examples, the prosthetic device is coupled to harness 84 via a magnetic coupler 88, configured to be selectively coupled and de-coupled from the prosthetic device using one hand. This arrangement may be beneficial for some wearers 80 to allow for one-handed removal and installation of suspension and control straps while wearing harness 84. Harness 84 may be configured to stretch around a perimeter edge region of the harness (e.g., along an edge, such as first edge 16), and to be static in areas of a harness interior to the perimeter edge region (e.g., along an edge such as second edge 18).

Figure 15:
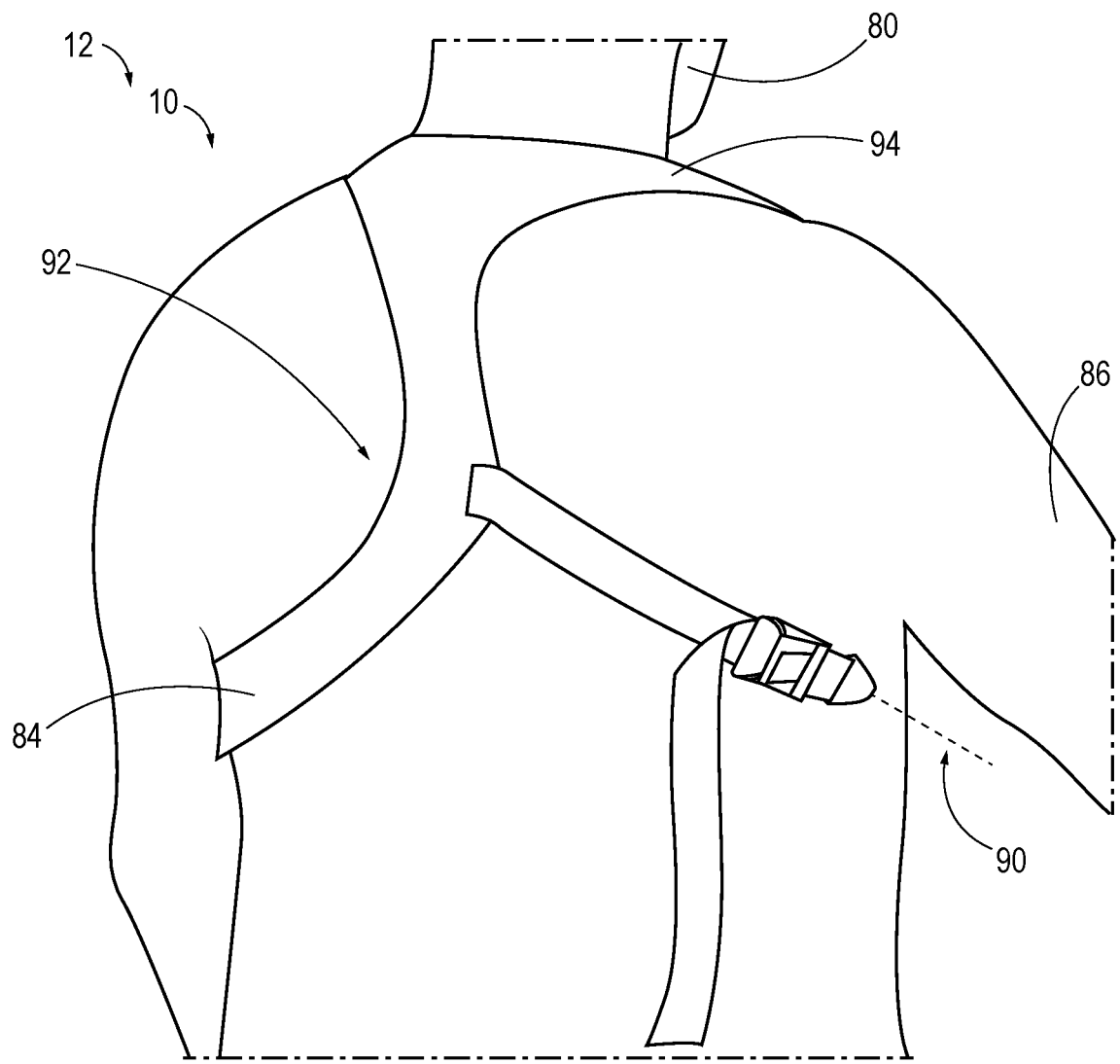
FIG. 15 is an example of a prosthetic limb harness incorporating presently disclosed textile assemblies, shown as worn on a wearer, viewed from a posterior side.

FIG. 15 shows an example of harness 84 viewed from the back or posterior side of wearer 80, that illustrates an example of a connection for a control cable 90 extending from harness 84 and configured to interface with a prosthetic limb, such as to operate an end effector of a prosthetic limb. In some examples, control cable 90 may be coupled to a fixed loop 92 of harness 84. Fixed loop 92 may be a portion of harness 84 (or other textile strap 12) that has a fixed static length and forms a closed loop, without adjustment mechanisms within fixed loop 92, though some or all of fixed loop 92 may be configured to have zones of stretch gradients as desired for a given application. In some examples, fixed loop 92 may be configured to eliminate or reduce axial migration and pressure on the wearer's body. In the examples of FIGS. 14-15, fixed loop 92 is configured to be positioned over the wearer's sound shoulder, extending around anterior and posterior sides of the upper body, and along the side of the torso under the armpit. An extension 94 may extend from fixed loop 92, with extension 94 being configured to extend across the wearer's back and/or behind the wearer's neck towards residual limb 86, and then over the top of the shoulder of residual limb 86 to couple to the prosthetic limb via a suspension strap. In some examples, extension 94 forms a Y shape with fixed loop 92. An extension strap 130 may extend as a tail of fixed loop 92 (e.g., a shoulder loop) without a shoulder extension 94, thereby creating a complete FIG. 9 harness, or with a shoulder extension 94, thereby creating a FIG. 8 harness. Portions of disclosed textile assemblies 10 configured to exhibit the greatest stretch (e.g., first edge 16 within span 26) may be configured to be placed on the wearer in areas where conventional straps tend to dig in to the wearer's body. In this manner, rather than digging in to the wearer's body, disclosed textile straps 12 instead expand, thereby allowing pressure to spread across the width of the textile strap. Such an edge may be included on one or both sides of a strap, depending on the part of the body or nature of the load. In some examples, first edge 16 of textile substrate 14 Is configured to be positioned about a shoulder and/or armpit region of wearer 80 when textile assembly 10 (e.g., as incorporated into harness 84) is worn on the body. While harness 84 of FIGS. 14-15 is shown as a figure-8 style harness, other styles of harnesses 84 (e.g., FIG. 9 harnesses) also are within the scope of the present disclosure. Similarly, while harness 84 of FIGS. 14-15 is shown as a harness for securing a prosthetic limb for a transradial amputation, disclosed textile straps 12 and textile assemblies 10 may be incorporated into other types of harnesses for other levels of amputation, such as shoulder saddles for transhumeral amputations, belts for transfemoral amputations, and/or harnesses for shoulder disarticulation. Additionally, disclosed textile assemblies 10 may be incorporated into other types of belts, harnesses, or straps, such as military or police duty belts, climbing and safety harnesses, and backpack straps.

Figure 16:
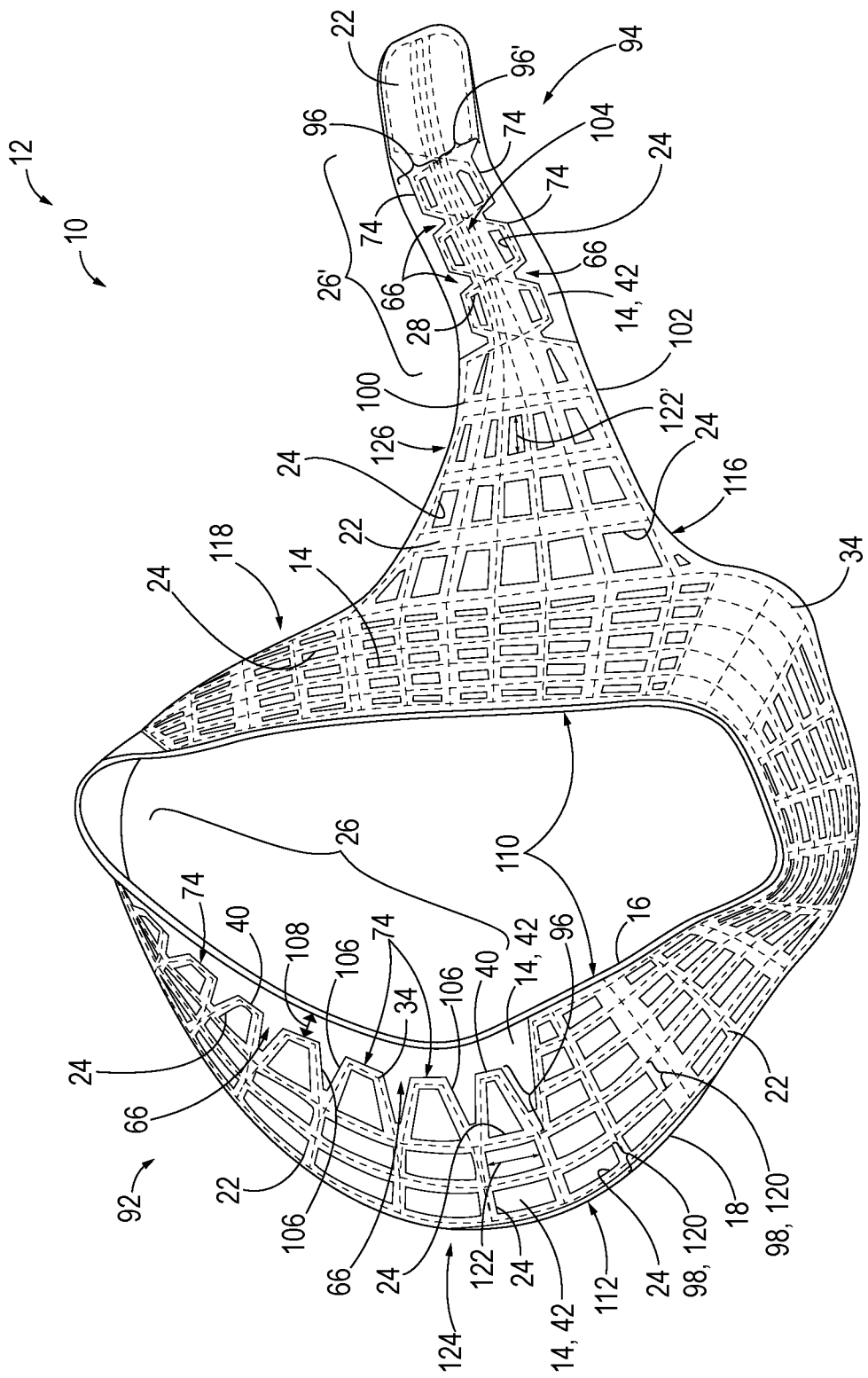
FIG. 16 is a plan view of an example of a textile assembly according to the present disclosure.

FIG. 16 shows an example of textile assembly 10 viewed from above, shown without any outer shell 60. As visible from FIG. 16, this example of textile assembly 10 is patterned with 3D-contours such that it does not naturally lay flat when placed on a 2D-surface. Textile assembly 10 of FIG. 16 includes fixed loop 92 and extension 94 extending therefrom, with textile assembly 10 being continuous around or along both fixed loop 92 and extension 94. FIG. 16 shows first side 42 of textile substrate 14 with patterned textile laminate 22 positioned thereon and secured via stitching 34. In this example, width 20 of textile substrate 14 (and thus the overall width of textile assembly 10) varies along fixed loop 92 and extension 94. For example, width 20 of textile substrate 14 may be slightly greater within span 26 where a gradient of stretch is provided, and slightly narrower in other areas of fixed loop 92. Width 20 of textile substrate 14 along extension 94 may be greatest where extension 94 joins fixed loop 92 and gradually narrows along a contour line.

Textile assembly 10 includes holes 24 positioned around fixed loop 92, as well as along extension 94, and gaps 66 positioned within a first span 26 of fixed loop 92, as well as within a second span 26' of extension 94. Within span 26 of fixed loop 92, each gap 66 narrows as it extends from first edge 16 towards second edge 18. In other words, a widest portion of each gap 66 may be closer to first edge 16 of textile substrate 14, while a narrowest portion of each gap 66 may be closer to second edge 18 of textile substrate 14. Gaps 66, however, are spaced apart from first edge 16 of textile substrate 14, such that textile substrate 14 extends beyond far end 40 of patterned textile laminate 22. A distance 108 between far end 40 of patterned textile laminate 22 and first edge 16 may be increased or decreased compared to the example shown in FIG. 16, and may be selected depending on a desired pattern of stretch gradient across width 20 of textile assembly 10.

In the example of FIG. 16, gaps 66 also are spaced apart from second edge 18 of textile substrate 14, as two rows of holes 24 separate gaps 66 from second edge 18. That said, an amount of longitudinal stretch along second edge 18 is minimal, or near-zero in this example, due to the materials used for patterned textile laminate 22 (e.g., non-stretch and/or low-stretch materials), the way patterned textile laminate 22 is secured to textile substrate 14 (e.g., via stitching 34 and/or bonding), the selection of holes 24 to avoid or minimize the amount of stretch permitted along second edge 18, and by any stitching 34 that crosses any of holes 24 along any contour. When textile assembly 10 is tensioned, or pulled along its longitudinal axis (substantially perpendicularly to width 20), textile assembly 10 is configured to stretch longitudinally within span 26, wherein the amount of stretch is greatest closer to first edge 16. Between far end 40 of patterned textile laminate 22 and first edge 16, the degree of stretch is largely determined by the material selected for textile substrate 14 (and any underlying layers), without much impact from patterned textile laminate 22, due to the absence of patterned textile laminate 22 along first edge 16 in this example. In the area of gaps 66, textile assembly 10 has a degree of longitudinal stretch due to the spacing between adjacent tabs 74, such that the tabs 74 are configured to fan out, or move away from one another, to accommodate stretch in textile assembly 10.

In FIG. 16, textile assembly 10 includes a first row 96 of gaps 66, extending towards first edge 16 from a first row 98 of holes 24 (which, in this example, are elongate shaped holes 24). In other examples, gaps 66 may be arranged differently, such as with first row 96 of gaps 66 extending towards second edge 18 instead of first edge 16. In some examples, gaps 66 may include a first row 96 of gaps 66 between tabs 74 extending towards first edge 16 and a second row of gaps 66 between tabs 74 extending towards second edge 18, such as in the example shown in FIG. 12. While rows 96 of gaps 66 may extend from one or more rows 98 of holes 24, in some examples, one or more rows 96 of gaps 66 may simply extend from solid portions of patterned textile laminate 22. For example, within span 26' of extension 94, a first row 96 of gaps 66 extends towards an upper edge 100 of extension 94 and a second row 96' of gaps 66 extends towards a lower edge 102 of extension 94, without any rows of holes therebetween. Extension 94 thereby is configured to stretch longitudinally within span 26' along both upper edge 100 and lower edge 102, while a central longitudinal portion 104 of extension 94 has little or no stretch. As seen in FIG. 16, patterned textile laminate 22 may stop short of both opposing edges (e.g., upper edge 100 and lower edge 102) of extension 94 extending from fixed loop 92.

With reference again to span 26 within fixed loop 92 of FIG. 16, each respective tab 74 may include opposing angled sides 106, such that each respective adjacent pair of tabs 74 is arranged such that a respective distance between a respective pair of adjacent angled sides 106 (e.g., the width of gap, or space 66) increases closer to first edge 16 of textile substrate 14 and decreases closer to second edge 18 of textile substrate 14. In other words, the amount of textile substrate 14 exposed between tabs 74 changes along width 20 of textile substrate 14. Gaps 66 are shown in FIG. 16 with textile assembly 10 at rest, or unloaded, though as textile assembly 10 is tensioned and tabs 74 are stretched apart from one another, gaps 66 will stretch and increase in width to accommodate stretch and help create the gradient of stretch between first edge 16 and second edge 18. In various examples of textile assembly 10, gaps 66 may be present to varying degrees, and along varying lengths of one or more spans 26, to create the desired stretch gradient and placement depending on the nature of the load being secured to the wearer via textile strap 12, the part(s) of the body involved, and which edge or edges (or portions thereof) would benefit from pressure relief. In some examples, span 26 may extend around at least half of the circumference of fixed loop 92, such that gaps 66 are present along at least half of the circumference of fixed loop 92. In various examples of textile assemblies 10 and textile straps 12, gaps 66 may be present along at least 10% of a length or circumference of textile assembly 10, at least 20% of a length or circumference of textile assembly 10, at least 30% of a length or circumference of textile assembly 10, at least 40% of a length or circumference of textile assembly 10, at least 50% of a length or circumference of textile assembly 10, at least 60% of a length or circumference of textile assembly 10, at least 70% of a length or circumference of textile assembly 10, at least 90% of a length or circumference of textile assembly 10, and/or at least 90% of a length or circumference of textile assembly 10. Multiple spans 26 may include gaps 66 within a given length or circumference of textile assemblies 10.

In the example shown in FIG. 16, for example, pressure relief is created via disclosed stretch gradients on both sides of extension 94 (e.g., upper edge 100 and lower edge 102), but only on first edge 16 within span 26 of fixed loop 92 (which may correspond to the inside edge against the wearer's shoulder when textile assembly 10 is worn). First edge 16 of textile substrate 14 forms an inner perimeter 110 of fixed loop 92 such that the degree of stretch is greatest on inner perimeter 110 of fixed loop 92 and oriented opposite the direction of primary tension applied to fixed loop 92 during loading by a prosthetic arm. Similarly, gaps 66 between adjacent tabs 74 and/or distances 108 between the end of patterned textile laminate 22 and one or more edges of textile assembly 10 may be selected depending on the desired effect, and quantified via the formulas discussed herein. The resulting gradient in the degree of stretch across textile assembly 10 is the change in those contours of constant stretch across the desired area in the transverse direction. While examples herein primarily are described in the context of varying degrees of stretch across width 20 of textile assemblies 10, stretch gradients as described herein additionally or alternatively may be created to vary the stretch properties across a length or other dimension of textile assemblies 10.

Figure 20:
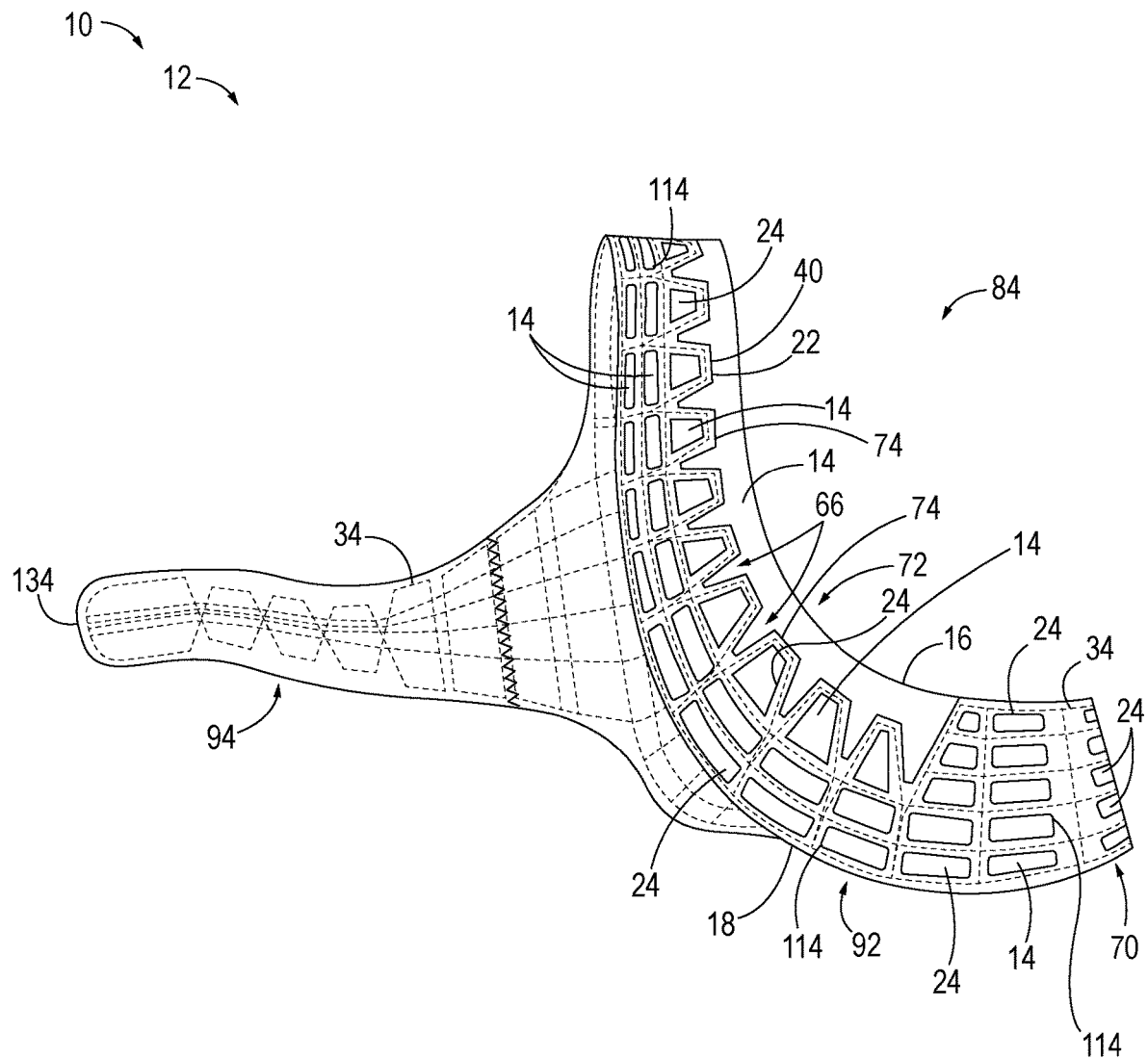
FIG. 20 is an anterior plan view of the textile assembly of FIG. 16, shown in a configuration corresponding approximately to the configuration of the harness of FIG. 18.

At least some of holes 24 may be elongate, and/or substantially rectangular, square, polygonal, oval, circular, and/or rhomboid. Additionally or alternatively, at least some of holes 24 have rounded corners. For example, in textile assembly 10 shown in FIG. 16, holes 24 indicated at 112 are examples of holes 24 that are elongate and substantially rectangular. Examples of similar holes 24 with rounded corners 114 are shown in FIG. 20, though any holes 24 may include rounded corners 114. Holes 24 indicated at 116 in FIG. 16 are examples of substantially square holes 24. Holes 24 indicated at 118 are narrower and shorter than holes indicated at 112, and thus expose less of textile substrate 14 in those areas of textile assembly 10. Respective lengths and/or widths of respective holes 24 may vary around a circumference of fixed loop 92 formed by textile assembly 10. Thus, the size and shape of holes 24 may vary in different areas of textile assembly 10 to create desired effects, such as increased breathability in areas of textile assembly 10 with more holes 24 and/or larger holes 24, which may be positioned in textile assembly 10 in areas corresponding to portions of textile assembly 10 that may be desired to have increased breathability due to demands placed on textile assembly 10 during use. Further, any shape of hole 24 can be crossed by stitching 34 in any direction, in order to prevent mechanical deformation across any contour, while preserving maximum breathability and wicking through the hole.

In some examples of textile assembly 10, such as shown in FIG. 16, at least some of holes 24 are arranged in parallel rows 120. For example, FIG. 16 shows two parallel rows 120 of holes 24 within span 26 of fixed loop 92, and five parallel rows 120 of holes 24 in other areas of fixed loop 92. The number of parallel rows 120 is not limiting, however, and other examples of textile assembly 10 may include greater or fewer parallel rows 120 of holes 24 in various locations of textile assembly 10. Some or all of holes 24 may have a major axis 122 that is substantially perpendicular to width 20 of textile assembly 10. This can be seen as indicated in FIG. 16 on both fixed loop 92 and extension 94. In some examples, a first plurality 124 of holes 24 has a first major axis 122 that is substantially perpendicular to a second major axis 122' of a second plurality 126 of holes 24, which may result from contours and shapes of textile assembly 10 (e.g., fixed loop 92 and extension 94).

Figure 17:
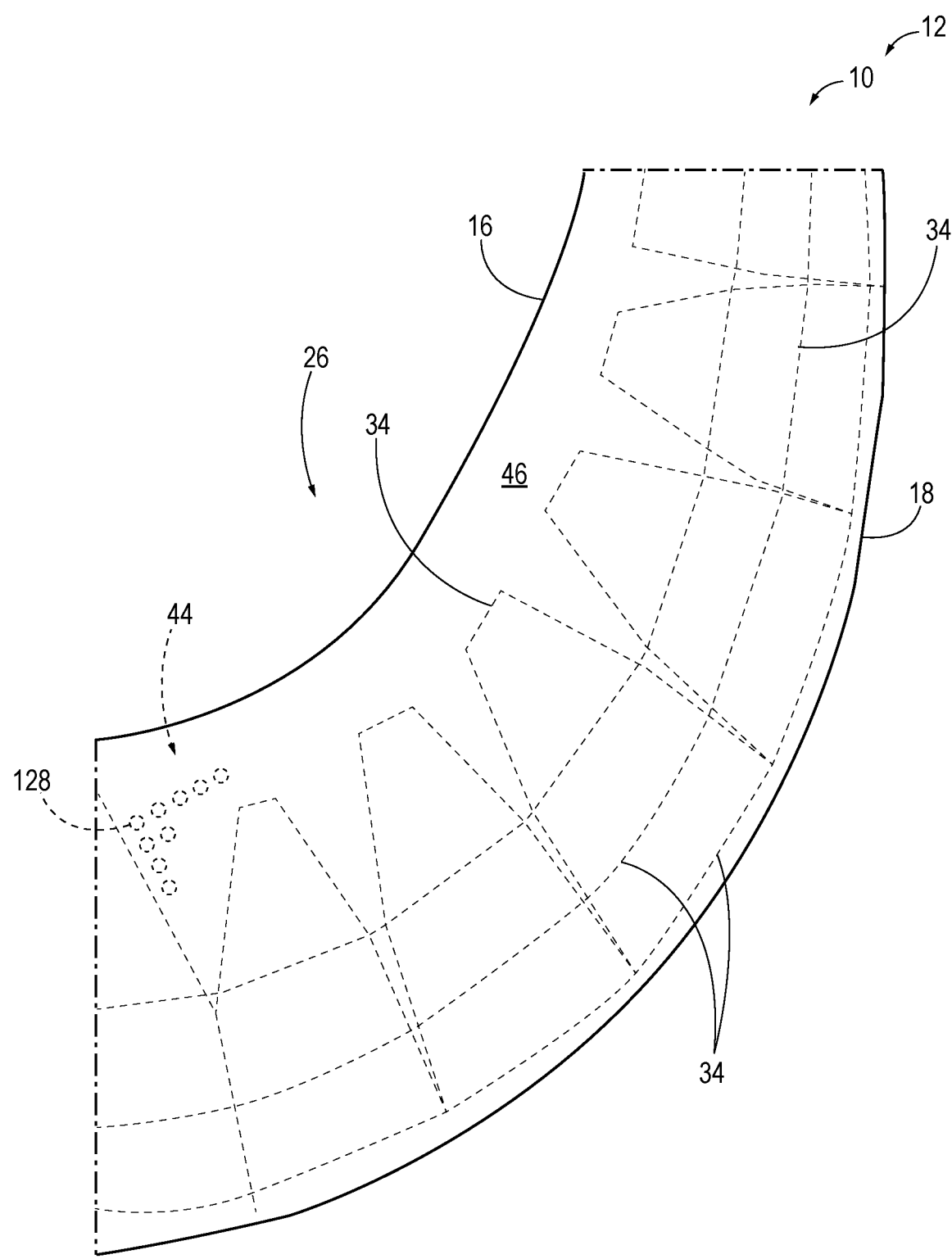
FIG. 17 is a plan view of one side of an example of a textile assembly according to the present disclosure.

FIG. 17 shows a portion of textile assembly 10 from FIG. 16, shown from the back side of textile assembly 10 (e.g., with second side 44 of textile substrate 14 facing out). In this view, stretch glue layer 46 is visible, as well as stitching 34 that couples textile substrate 14, patterned textile laminate 22, and stretch glue layer 46 together. As visible from the pattern of stitching shown in FIG. 17, the portion of textile assembly 10 shown in FIG. 17 corresponds to span 26 with gaps 66 formed through patterned textile laminate 22. Stretch glue layer 46 may include perforations 128 as well, for improved breathability of this layer, as shown in FIG. 17.

Figure 18:
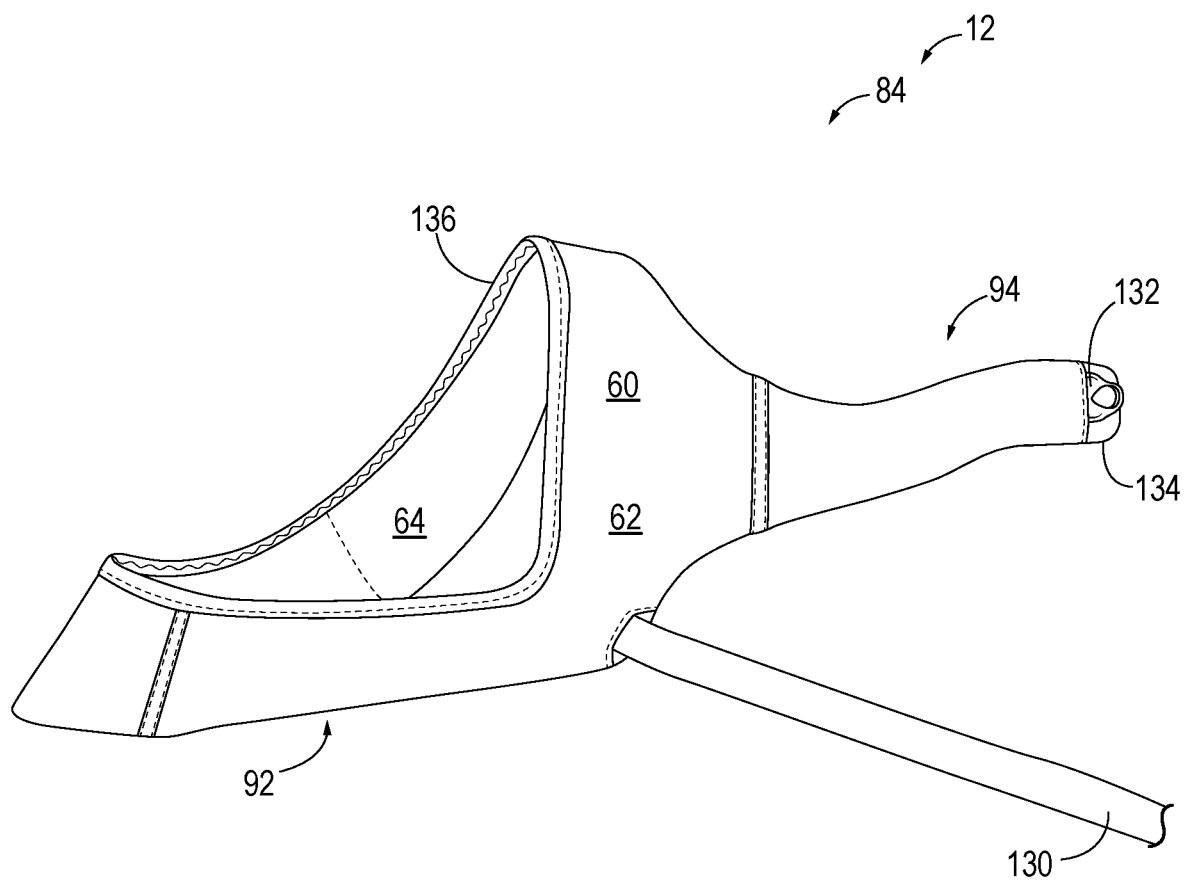
FIG. 18 is a posterior plan view of an example of a harness for securing a prosthetic limb to a wearer, which may incorporate presently disclosed textile assemblies.
Figure 19:
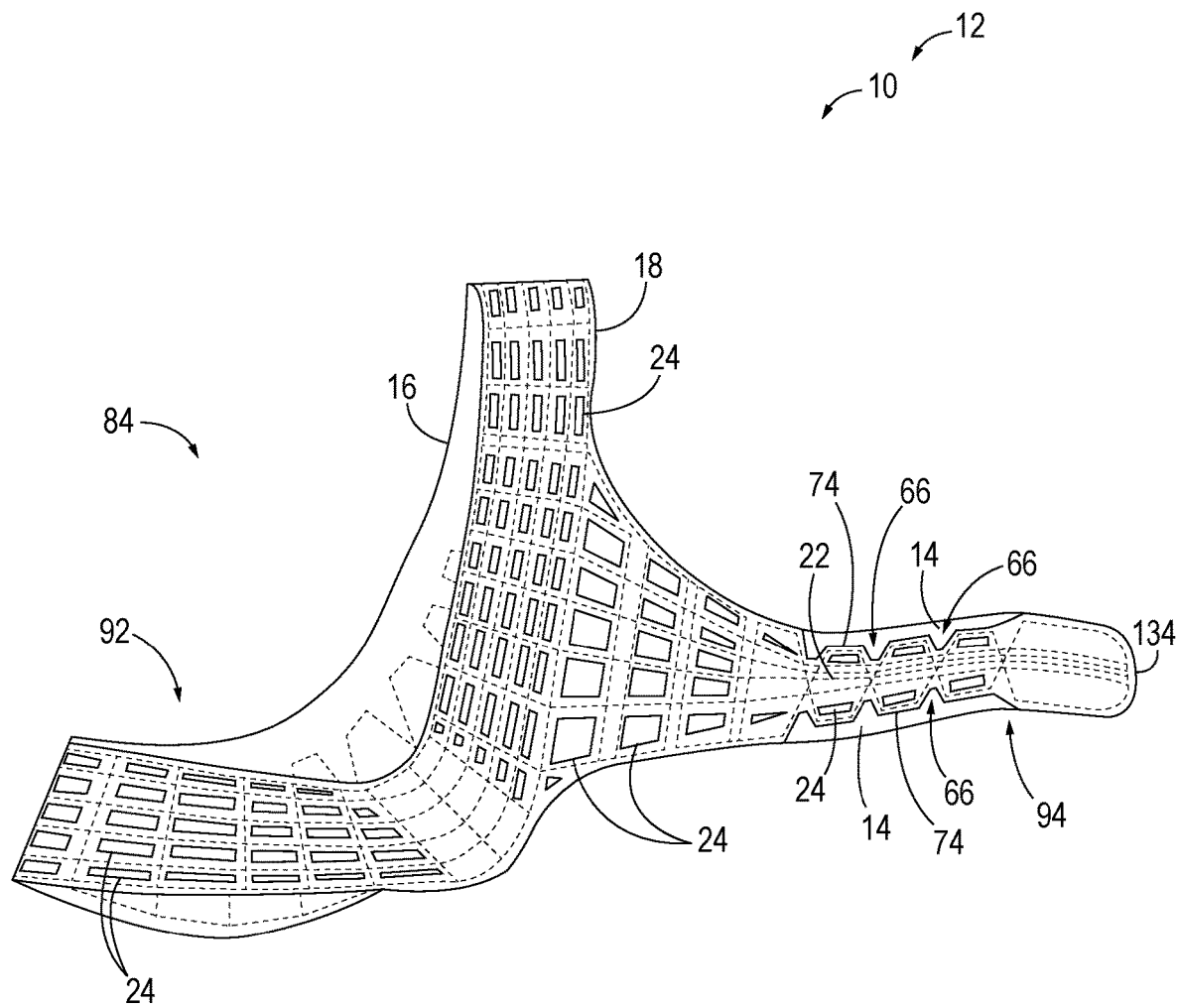
FIG. 19 is a posterior plan view of the textile assembly of FIG. 16, shown in a configuration corresponding approximately to the configuration of the harness of FIG. 18.
Figure 21:
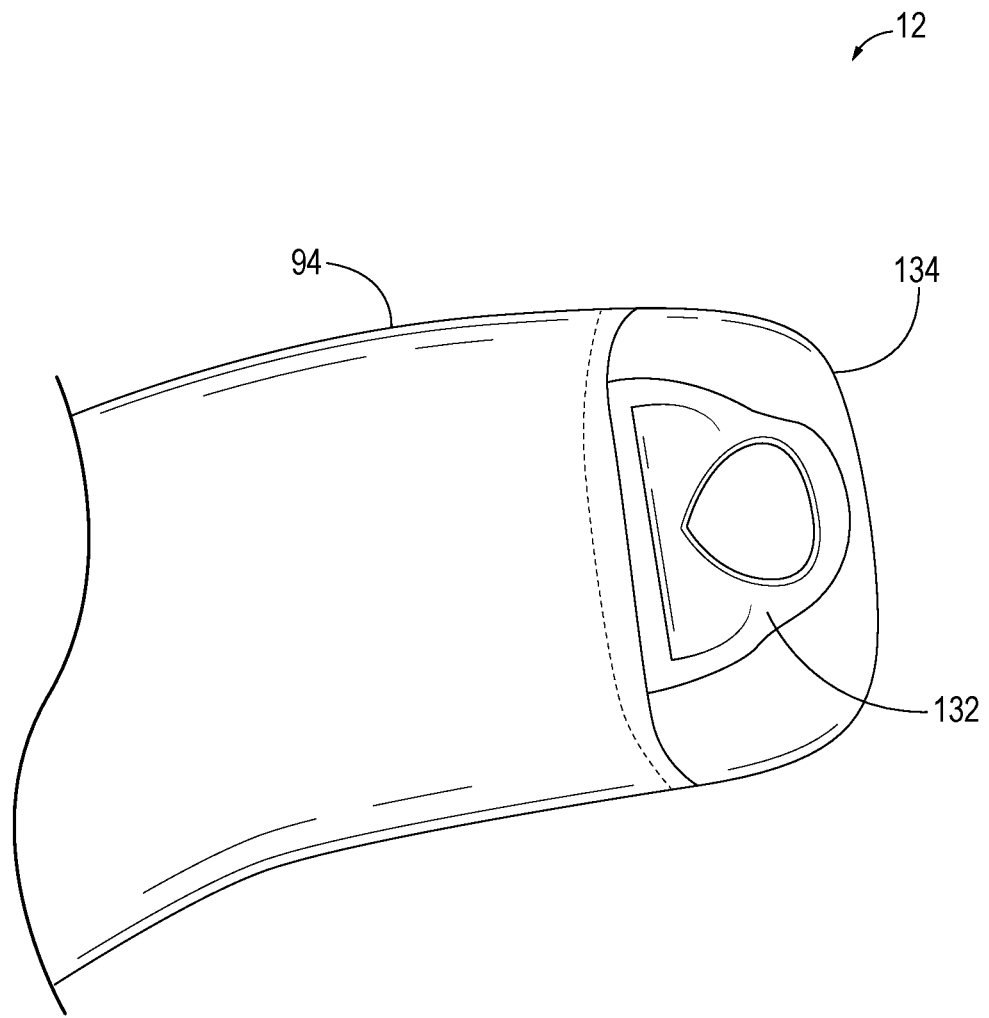
FIG. 21 is a plan view of a buckle that may be included in disclosed harnesses and/or textile assemblies.

FIG. 18 shows an example of textile strap 12 in the form of harness 84, arranged in an approximate configuration as it may be worn by a wearer, shown from the back. FIG. 19 shows the internal textile assembly 10 from within outer shell 60 of harness 84, shown without outer shell 60 and in the same approximate configuration as in FIG. 18, also viewed from the back, while FIG. 20 shows internal textile assembly 10 without outer shell 60, viewed from the front. Disclosed textile assemblies 10 and/or textile straps 12 may include at least one strap 130 and/or buckle 132 configured to secure textile assembly 10 with respect to the wearer's body and/or to secure an accessory or other component with respect to textile assembly 10. For example, as shown in FIG. 18, a strap 130 may extend from fixed loop 92 on the posterior side of harness 84, and may be configured to operatively couple harness 84 to a prosthetic limb (not shown). An example of buckle 132 is shown at a distal end 134 of extension 94, opposite where extension 94 joins fixed loop 92. Strap 130 and/or buckle 132 are directly coupled to textile assembly 10 in some examples. Additionally or alternatively, strap 130 and/or buckle 132 may be positioned between textile assembly 10 and outer shell 60 of textile strap 12 in which textile assembly 10 is incorporated. Strap 130 may be formed of conventional strap or webbing materials, such as Dacron®, in some examples. Additionally or alternatively, textile straps 12 may include padding or cushioning positioned under strap 130 and/or buckle 132, such that the padding or cushioning is configured to be positioned between strap 130 and/or buckle 132 and the wearer's body when textile assembly 10 is worn. Said padding or cushioning is stretch padding or cushioning in some examples. In examples where strap 130 and/or buckle 132 are coupled to patterned textile laminate 22 of textile assembly 10, strap 130 and/or buckle 132 may be positioned on an opposite side of patterned textile laminate 22 from textile substrate 14. FIG. 21 shows a close-up of an example of buckle 132 as positioned with respect to distal end 134 of extension 94.

Figure 22:
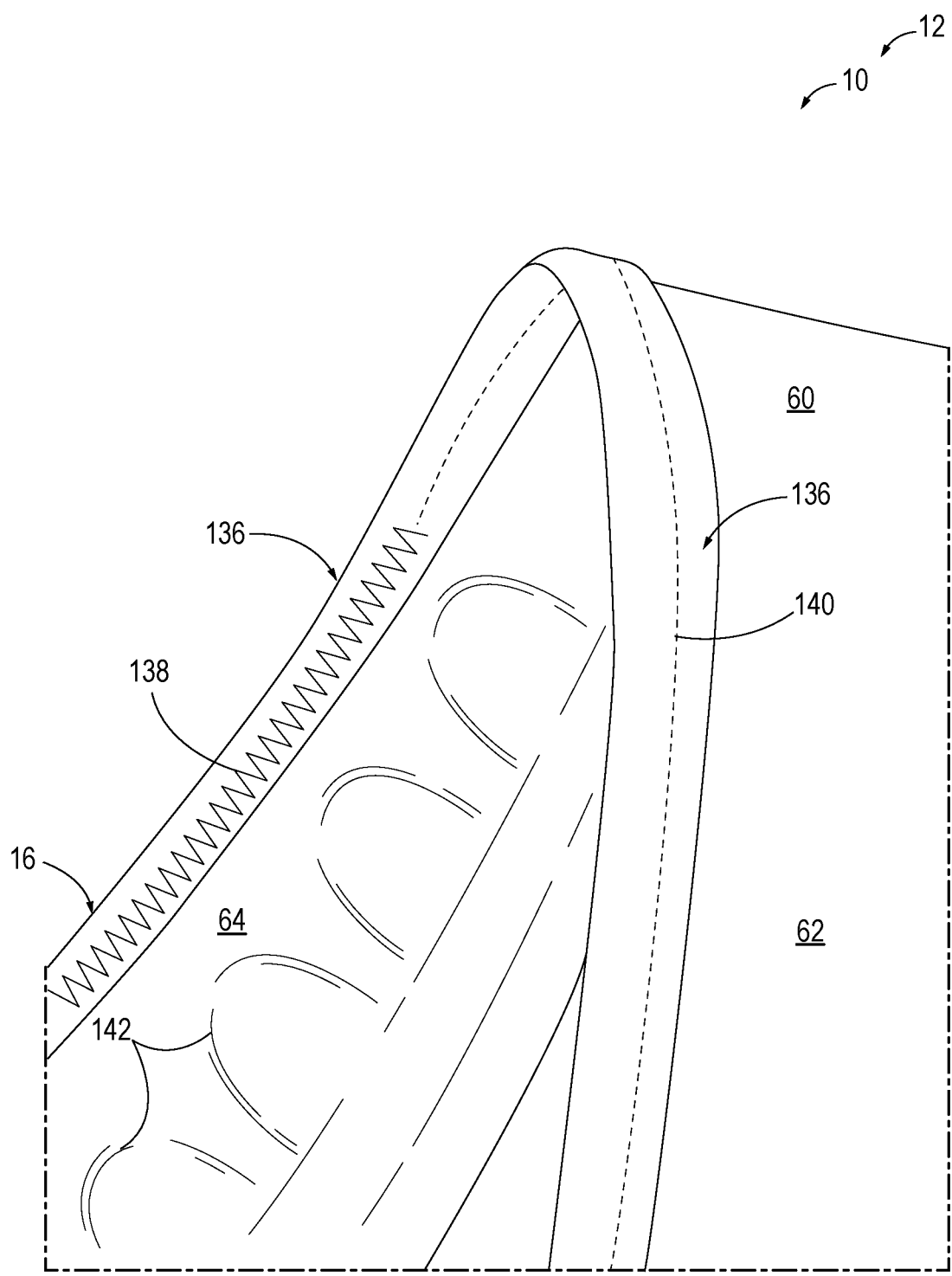
FIG. 22 is a close-up plan view of a portion of the harness of FIG. 18.

FIG. 22 shows a close-up of a portion of an example of textile strap 12 with an internal textile assembly 10 positioned within outer shell 60. As shown in FIG. 22, outer shell 60 may include an elastic edge binding, or elastic tape, 136 along first edge 16 and/or second edge 18 of textile substrate 14. Edge binding 136 may be configured to secure outer shell 60 to textile assembly 10 along first edge 16 and/or second edge 18, while preserving the stretch of textile assembly 10 along first edge 16 and/or second edge 18. For example, edge binding 136 is generally provided using elastic materials and/or elastic thread for securing edge binding 136 to textile assembly 10. In some examples, at least a portion of edge binding 136 is secured to textile assembly 10 using zigzag stitching 138, to further help preserve stretch of textile assembly 10. In some examples, edge binding 136 may be secured to textile assembly 10 using zigzag stitching 138 in areas where textile assembly 10 is configured to stretch (e.g., along first edge 16 and within span 26), while other areas of edge binding 136 may be secured to textile assembly 10 with straight stitching 140, as shown in FIG. 22.

Also visible in FIG. 22 is a portion of inner layer 64 of outer shell 60, where impressions 142 corresponding to textile assembly 10 within outer shell 60 may be visible, such as from heat-pressing outer shell 60 and textile assembly 10 together. For example, a heat press may be used to bond stretch glue layer 46 of textile assembly 10 to inner layer 64 of outer shell 60, during which process all of the layers of textile assembly 10 are pressed together with outer shell 60. Thus, impressions 142 may create a texture corresponding to outlines, or perimeters, of patterned textile laminate 22 and/or stitching 34. In some examples, impressions 142 may help increase friction between outer shell 60 and the wearer to improve anti-slip performance of textile strap 12.

Figure 23:
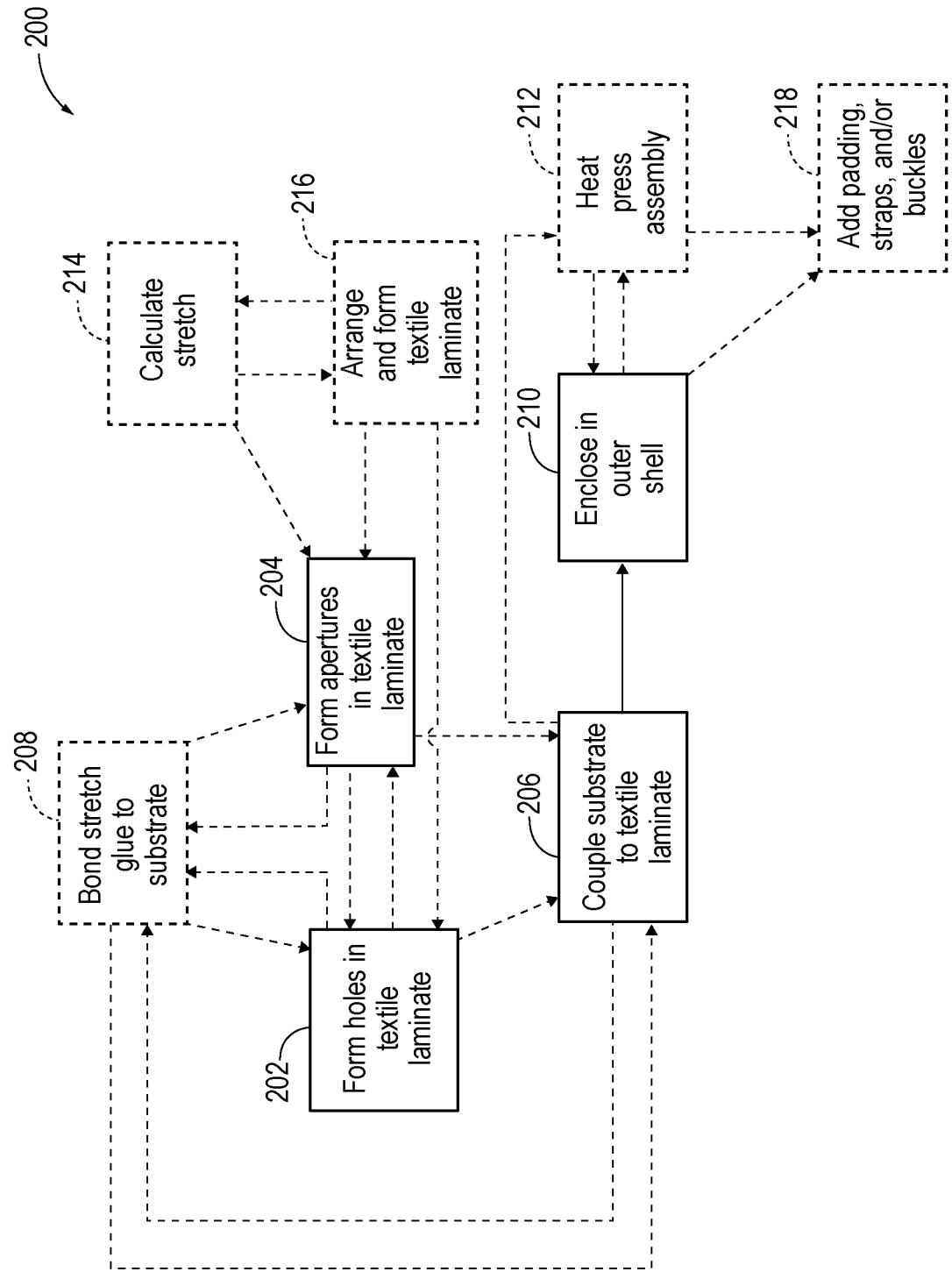
FIG. 23 is a schematic flowchart diagram illustrating examples of methods of making textile assemblies, according to the present disclosure.

FIG. 23 schematically provides a flowchart that represents illustrative, non-exclusive examples of methods according to the present disclosure. In FIG. 23, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 23 are not limiting, and other methods and steps are within the scope of the present disclosure, including methods having greater than or fewer than the number of steps illustrated, as understood from the discussions herein. In one such example, engineered knitting may be used to produce the entire garment (e.g., textile strap 12, harness 84), including the functional equivalents of all the subcomponents, in a single step. For example, engineered knit software may be used to create a knit pattern that achieves desired fabric performance requirements in the prescribed regions, within the limitations of fiber densities, etc. Some of these programs are capable of taking diagrams similar to those included herein, and making a programmable pattern for a particular machine from an image alone.

Methods 200 of making a textile assembly (e.g., textile assembly 10) generally include forming a plurality of holes (e.g., holes 24) in a patterned textile laminate (e.g., patterned textile laminate 22), at 202, such that the holes are configured to enhance breathability of the textile assembly. Forming the holes at 202 may be performed by, for example, laser-cutting, stamping, and/or other cutting techniques. Methods 200 also include forming a plurality of gaps (e.g., gaps 66) within a length, or span (e.g., span 26) of the patterned textile laminate, at 204, such that the gaps create a gradient of flexibility and compliance within the span of the patterned textile laminate. Forming the gaps at 204 may be performed by, for example, laser-cutting, stamping, and/or other cutting techniques. Methods 200 also include coupling a stretch textile substrate (e.g., textile substrate 14) to the patterned textile laminate, at 206, such that tabs between the gaps are spaced apart from the first edge and the second edge of the textile substrate. For example, coupling the textile substrate to the patterned textile laminate at 206 may include bonding the textile substrate to the patterned textile laminate and/or stitching the textile substrate to the patterned textile laminate (e.g., via stitching 34).

Additional components also may assembled to form the textile assembly. For example, a layer of stretch glue (e.g., stretch glue 46) may be applied at 208, such as to the textile substrate opposite the patterned textile laminate. One or more layers of the textile assembly may be heat pressed together, at 212. Before or after heat pressing at 212, the textile assembly may be enclosed or encased in an outer shell (e.g., outer shell 60), at 210. One or more steps of methods 200 may be completed in 2D, with any final 3D-shape being created later in the process, thereby simplifying and allowing the automation of most manufacturing steps of methods 200. Additionally or alternatively, methods 200 may include adding padding, straps, and/or buckles, at 218, to the textile strap.

In some methods 200, a degree, or extent, of desired stretch or elasticity along first edge and/or second edge of the textile substrate may be predicted, or calculated, at 214. Specifically, a desired degree of elasticity or stretch along the first edge of the textile substrate may be determined, and a number, orientation, and placement of the plurality of gaps that will create the desired degree of elasticity or stretch along the first edge of the textile substrate also may be determined. This calculation or determination at 214 may be used to arrange and form the patterned textile laminate, at 216, and/or to determine size, placement, orientation, spacing, and/or shape of gaps formed through patterned textile laminate at 204. To the extent desired, forming the gaps at 204 may be configured to cause the degree of elasticity (e.g., the percentage of length a material may be stretched) of the textile assembly in a direction substantially perpendicular to the width of the stretch textile substrate to increase along the width towards the first edge and to decrease along the width towards the second edge. Additionally or alternatively, the arranging and forming the textile laminate at 216 may include arranging a first layer and a second layer of the patterned textile laminate with respect to one another such that a first PVC side of the first layer faces a second PVC side of the second layer, such that a first nylon side of the first layer faces away from the stretch textile substrate, and such that a second nylon side of the second layer faces and/or contacts the stretch textile substrate. The first layer and the second layer may be bonded together to form the patterned textile laminate.

Illustrative, non-exclusive examples of inventive subject matter according to the present disclosure are described in the following enumerated paragraphs:

A1. A textile assembly configured to be incorporated into a textile strap, the textile assembly comprising:
    a stretch textile substrate having a width extending from a first edge to a second edge; and
    a patterned textile laminate that is non-stretch or low-stretch, wherein the patterned textile laminate is coupled to the stretch textile substrate, wherein the patterned textile laminate comprises a plurality of holes formed therethrough, the plurality of holes being configured to enhance breathability of the textile assembly, and wherein the textile assembly has a gradient of flexibility and compliance within a span of the patterned textile laminate.

A1.1. The textile assembly of paragraph A1, comprising axial contours of stretch that vary between a maximum of stretch dictated by the stretch textile substrate, and a minimum of stretch dictated by the patterned textile laminate.

A1.2. The textile assembly of paragraph A1 or A1.1, wherein the plurality of holes comprises a plurality of elongate holes.

A1.3. The textile assembly of any of paragraphs A1-A1.2, wherein the span of the patterned textile laminate comprises a plurality of gaps formed therethrough, and wherein the plurality of gaps create the gradient of flexibility and compliance.

A1.4. The textile assembly of any of paragraphs A1-A1.2, wherein the span of the patterned textile laminate comprises a plurality of tabs, and wherein the plurality of tabs create the gradient of flexibility and compliance.

A1.5. The textile assembly of paragraph A1.4, wherein each respective pair of adjacent tabs of the plurality of tabs comprises a gap formed therebetween.

A2. The textile assembly of any of paragraphs A1-A1.5, wherein a/the plurality of gaps cause a degree of elasticity of the textile assembly in a direction substantially perpendicular to the width of the stretch textile substrate to increase along the width towards the first edge and to decrease along the width towards the second edge.

A3. The textile assembly of any of paragraphs A1-A2, further comprising stitching repeatedly passing through and/or across the textile assembly.

A4. The textile assembly of paragraph A3, wherein the stitching is configured to couple the patterned textile laminate to the stretch textile substrate.

A5. The textile assembly of any of paragraphs A3-A4, wherein the stitching comprises Kevlar thread.

A6. The textile assembly of any of paragraphs A3-A5, wherein the stitching axially follows a plurality of contour lines of the textile assembly, and wherein the stitching is configured to limit, prevent, and/or reduce stretch along the plurality of contour lines.

A7. The textile assembly of any of paragraphs A3-A6, wherein the stitching follows a respective gap perimeter of each respective gap of a/the plurality of gaps.

A8. The textile assembly of any of paragraphs A3-A7, wherein the stitching follows and/or crosses a respective hole perimeter of each respective hole of the plurality of holes.

A9. The textile assembly of any of paragraphs A3-A8, wherein the stitching follows a singular continuous path throughout the textile assembly.

A10. The textile assembly of any of paragraphs A1-A9, wherein each gap of a/the plurality of gaps narrows as it extends from the second edge towards the first edge.

A11. The textile assembly of any of paragraphs A1-A10, wherein a respective far end of the patterned textile laminate is spaced apart from the first edge within the span of the patterned textile laminate.

A12. The textile assembly of paragraph A11, wherein the respective far end of each respective tab of a/the plurality of tabs is spaced apart from the first edge by a distance of at least 0.25 inches, 0.5 inches, 0.75 inches, 1 inch, 1.5 inches, and/or 2 inches.

A13. The textile assembly of any of paragraphs A1-A12, wherein a/the respective far end of each respective tab of a/the plurality of tabs is spaced apart from the second edge.

A14. The textile assembly of paragraph A13, wherein the respective far end of each respective tab of a/the plurality of tabs is spaced apart from the second edge by a distance of at least 0.25 inches, 0.5 inches, 0.75 inches, 1 inch, 1.5 inches, and/or 2 inches.

A15. The textile assembly of any of paragraphs A1-A14, wherein a/the plurality of tabs comprises a first row of tabs extending towards the first edge from a first row of holes of the plurality of holes.

A16. The textile assembly of any of paragraphs A1-A15, wherein a/the plurality of gaps comprises a/the first row of gaps extending towards the first edge.

A17. The textile assembly of any of paragraphs A1-A16, wherein a/the plurality of gaps comprises a second row of gaps extending towards the second edge from a second row of holes of the plurality of holes.

A18. The textile assembly of any of paragraphs A1-A17, wherein a/the plurality of gaps comprises a/the second row of gaps extending towards the second edge.

A19. The textile assembly of any of paragraphs A1-A18, wherein each respective tab of a/the plurality of tabs comprises opposing angled sides, and wherein each respective adjacent pair of tabs is arranged such that a respective distance between a respective pair of adjacent angled sides increases closer to the first edge of the stretch textile substrate and decreases closer to the second edge of the stretch textile substrate.

A20. The textile assembly of any of paragraphs A1-A19, wherein a/the plurality of gaps are present along at least half of a length or a circumference of the textile assembly.

A21. The textile assembly of any of paragraphs A1-A20, wherein the stretch textile substrate comprises a four-way stretch material.

A22. The textile assembly of any of paragraphs A1-A21, wherein the stretch textile substrate comprises a spacer mesh material.

A23. The textile assembly of any of paragraphs A1-A22, wherein the textile assembly is breathable.

A24. The textile assembly of any of paragraphs A1-A23, wherein the textile assembly is moisture-wicking.

A25. The textile assembly of any of paragraphs A1-A24, wherein the stretch textile substrate comprises a first side and a second side opposite the first side.

A26. The textile assembly of paragraph A25, wherein the first side is configured to face away from a wearer's body when the textile assembly is worn.

A27. The textile assembly of paragraph A25 or A26, wherein the second side faces and/or contacts a perforated stretch glue layer of the textile assembly.

A28. The textile assembly of paragraph A27, wherein the perforated stretch glue layer is configured to preserve areas of stretch in overall stretch of the textile assembly.

A29. The textile assembly of any of paragraphs A27-A28, wherein the perforated stretch glue is breathable.

A30. The textile assembly of any of paragraphs A25-A29, wherein the second side faces a/the wearer's body when the textile assembly is worn.

A31. The textile assembly of any of paragraphs A1-A30, wherein the patterned textile laminate comprises a woven material.

A32. The textile assembly of any of paragraphs A1-A31, wherein the patterned textile laminate is waterproof.

A33. The textile assembly of any of paragraphs A1-A32, wherein the patterned textile laminate is bonded to the stretch textile substrate.

A34. The textile assembly of any of paragraphs A1-A33, wherein the patterned textile laminate is sewn or stitched to the stretch textile substrate.

A35. The textile assembly of any of paragraphs A1-A34, wherein the patterned textile laminate comprises a PVC-coating.

A36. The textile assembly of any of paragraphs A1-A35, wherein the patterned textile laminate comprises nylon.

A37. The textile assembly of any of paragraphs A1-A36, wherein the patterned textile laminate comprises a first layer of PVC-coated nylon and a second layer of PVC-coated nylon, and wherein the first layer and the second layer are arranged with respect to one another such that a first PVC side of the first layer faces a second PVC side of the second layer.

A38. The textile assembly of paragraph A37, wherein a first nylon side of the first layer faces away from the stretch textile substrate.

A39. The textile assembly of paragraph A37 or A38, wherein a second nylon side of the second layer faces and/or contacts the stretch textile substrate.

A40. The textile assembly of any of paragraphs A7-A39, wherein the first layer and the second layer are bonded together.

A41. The textile assembly of any of paragraphs A1-A40, wherein the textile assembly is configured to conform to a/the body of a/the wearer of the textile assembly.

A42. The textile assembly of any of paragraphs A1-A41, wherein at least a portion of holes of the plurality of holes are substantially circular, rectangular, square, polygonal, and/or rhomboid.

A43. The textile assembly of any of paragraphs A1-A42, wherein at least some holes of the plurality of holes have rounded corners.

A44. The textile assembly of any of paragraphs A1-A43, wherein at least some holes of the plurality of holes are arranged in parallel rows.

A45. The textile assembly of any of paragraphs A1-A44, wherein at least some holes of the plurality of holes have a major axis that is substantially perpendicular to a/the width of the textile assembly.

A46. The textile assembly of any of paragraphs A1-A45, wherein respective lengths and/or widths of respective holes of the plurality of holes vary around a circumference of a fixed loop formed by the textile assembly.

A47. The textile assembly of any of paragraphs A1-A46, wherein the plurality of holes comprise a first plurality of holes and a second plurality of holes, and wherein a first major axis of the first plurality of holes is substantially perpendicular to a second major axis of the second plurality of holes.

A48. The textile assembly of any of paragraphs A1-A47, wherein the textile assembly comprises a/the fixed loop formed by the textile assembly.

A49. The textile assembly of any of paragraphs A1-A48, wherein the textile assembly comprises an elongate extension extending from a/the fixed loop.

A50. The textile assembly of any of paragraphs A1-A49, wherein the textile assembly extends around a/the fixed loop and along a/the elongate extension extending from the fixed loop.

A51. The textile assembly of any of paragraphs A1-A50, wherein the width of the stretch textile substrate varies around a/the fixed loop formed by the textile assembly.

A52. The textile assembly of any of paragraphs A1-A51, wherein the first edge of the stretch textile substrate is configured to be positioned about a shoulder and/or an armpit region of a/the wearer when the textile assembly is worn on the body.

A53. The textile assembly of any of paragraphs A1-A52, wherein the first edge forms a portion of an inner perimeter of a/the fixed loop formed by the textile assembly.

A54. The textile assembly of any of paragraphs A1-A53, wherein the patterned textile laminate stops short of both opposing edges of an/the elongate extension extending from a/the fixed loop formed by the textile assembly.

A55. The textile assembly of any of paragraphs A1-A54, further comprising at least one strap and/or buckle configured to secure the textile assembly with respect to a/the wearer's body and/or to secure an accessory or other component with respect to the textile assembly.

A56. The textile assembly of paragraph A55, wherein the at least one strap and/or buckle is positioned on a distal end of an/the elongate extension of the textile assembly.

A57. The textile assembly of any of paragraphs A55-A56, wherein the at least one strap and/or buckle is directly coupled to the textile assembly.

A58. The textile assembly of any of paragraphs A55-A57, wherein the at least one strap and/or buckle is positioned between the textile assembly and an outer shell of the textile strap in which the textile assembly is incorporated.

A59. The textile assembly of any of paragraphs A55-A58, wherein the at least one strap and/or buckle comprises a Dacron® strap.

A60. The textile assembly of any of paragraphs A55-A59, further comprising padding or cushioning positioned under the at least one strap and/or buckle, such that the padding or cushioning is configured to be positioned between the at least one strap and/or buckle and a/the wearer's body when the textile assembly is worn.

A61. The textile assembly of any of paragraphs A55-A60, wherein the stretch textile substrate is positioned on an opposite side of the patterned textile laminate than the at least one strap and/or buckle.

B1. A textile strap comprising the textile assembly of any of paragraphs A1-A61.

B2. The textile strap of paragraph B1, further comprising an/the outer shell.

B3. The textile strap of paragraph B2, wherein the outer shell encases the textile assembly.

B4. The textile strap of any of paragraphs B2-B3, wherein the outer shell comprises elastic edge binding or tape along the first edge of the stretch textile substrate.

B5. The textile strap of paragraph B4, wherein the elastic edge binding or tape is coupled to the outer shell and the textile assembly via stretch thread.

B6. The textile strap of paragraph B5, wherein the stretch thread is stitched with a zigzag stitch.

B7. The textile strap of any of paragraphs B2-B6, wherein the outer shell comprises a four-way stretch material.

B8. The textile strap of any of paragraphs B2-B7, wherein the outer shell comprises a knit polyspan such as spandex or Lycra® on an inner side of the outer shell, wherein the inner side is configured to face a/the body of a/the wearer when the textile strap is worn.

B9. The textile strap of any of paragraphs B2-B8, wherein the outer shell comprises a stretch woven material on an outer side of the outer shell, wherein the outer side is configured to face away from a/the body of a/the wearer when the textile strap is worn.

B10. The textile strap of any of paragraphs B2-B9, wherein an/the outer side of the outer shell comprises a material selected to impart durability to the textile strap.

B11. The textile strap of any of paragraphs B2-B10, wherein the outer shell is water vapor permeable.

B12. The textile strap of any of paragraphs B2-B11, wherein the outer shell comprises two opposite layers that are bonded together at respective joints along the first edge and the second edge of the stretch textile substrate.

B13. The textile strap of any of paragraphs B2-B12, wherein the textile assembly is positioned between a/the two opposite layers of the outer shell such that the outer shell surrounds and encompasses the textile assembly within a channel of the outer shell.

B14. The textile strap of paragraph B13, wherein the textile assembly is configured to slide within the channel of the outer shell in response to loads applied to the textile strap.

B15. The textile strap of any of paragraphs B2-B14, further comprising a control strap configured to interface with a prosthetic limb.

B16. The textile strap of paragraph B15, wherein the control strap is coupled to a/the fixed loop formed by the textile assembly within the outer shell.

B17. The textile strap of any of paragraphs B2-B16, wherein the outer shell is configured to be non-slip.

B18. The textile strap of any of paragraphs B2-B17, wherein the outer shell is wicking.

B19. The textile strap of any of paragraphs A1-A61 or B1-B18, wherein the textile assembly is produced in a single step through engineered knitting, and wherein the functional equivalents of every subcomponent are created through a combination of the properties of any combination of knitting fibers, and through the arrangement of these fibers in the knit pattern.

C1. A harness configured to secure a prosthetic device for a user, comprising the textile strap of any of paragraphs B1-B19 and/or the textile assembly of any of paragraphs A1-A61.

C2. A duty belt, a military strap or belt, a shoulder strap for backpack, a climbing harness, and/or a safety harness comprising the textile strap of any of paragraphs B1-B18 and/or the textile assembly of any of paragraphs A1-A61.

D1. A method of making a textile assembly, the method comprising:
    forming a plurality of holes in a patterned textile laminate, wherein the patterned textile laminate is non-stretch or low-stretch, wherein the plurality of holes are configured to enhance breathability of the textile assembly;
    forming a plurality of gaps between adjacent respective tabs within a span of the patterned textile laminate, wherein the plurality of gaps create a gradient of flexibility and compliance within the span of the patterned textile laminate;
    coupling a stretch textile substrate to the patterned textile laminate, wherein the stretch textile substrate has a width extending from a first edge to a second edge, and wherein the plurality of tabs are spaced apart from the first edge and the second edge.

D1.1. The method of paragraph D1, wherein the textile assembly is the textile assembly of any of paragraphs A1-A61.

D2. The method of paragraph D1 or D1.1, wherein the forming the plurality of holes comprises laser-cutting.

D3. The method of any of paragraphs D1-D2, wherein the forming the plurality of gaps comprises laser-cutting.

D4. The method of any of paragraphs D1-D3, wherein the coupling the stretch textile substrate to the patterned textile laminate comprises bonding the stretch textile substrate to the patterned textile laminate.

D5. The method of any of paragraphs D1-D4, wherein the coupling the stretch textile substrate to the patterned textile laminate comprises stitching together the stretch textile substrate and the patterned textile laminate.

D6. The method of any of paragraphs D1-D5, further comprising applying a/the stretch glue layer to the stretch textile substrate opposite the patterned textile laminate.

D7. The method of any of paragraphs D1-D6, further comprising heat-pressing the textile assembly.

D8. The method of any of paragraphs D1-D7, further comprising calculating a/the degree of elasticity or stretch along the first edge and/or the second edge of the stretch textile substrate.

D9. The method of any of paragraphs D1-D8, wherein the forming the plurality of gaps causes a/the degree of elasticity of the textile assembly in a/the direction substantially perpendicular to the width of the stretch textile substrate to increase along the width towards the first edge and to decrease along the width towards the second edge.

D10. The method of any of paragraphs D1-D9, wherein the patterned textile laminate comprises a first layer of PVC-coated nylon and a second layer of PVC-coated nylon, and wherein the method further comprises:
    arranging the first layer and the second layer with respect to one another such that a first PVC side of the first layer faces a second PVC side of the second layer, such that a first nylon side of the first layer faces away from the stretch textile substrate, and such that a second nylon side of the second layer faces and/or contacts the stretch textile substrate; and bonding together the first layer and the second layer.

D11. The method of any of paragraphs D1-D10, further comprising adding padding, straps, and/or buckles to the textile assembly.

D12. The method of any of paragraphs D1-D11, further comprising determining a/the desired degree of elasticity or stretch along the first edge of the stretch textile substrate.

D13. The method of any of paragraphs D1-D12, further comprising determining a number, a size, a shape, an orientation, and/or a placement of the plurality of gaps, to create a/the desired degree of elasticity or stretch along the first edge of the stretch textile substrate.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A textile assembly configured to be incorporated into a textile strap, the textile assembly comprising:
   a stretch textile substrate having a width extending from a first edge to a second edge; and
   a patterned textile laminate that is non-stretch or low-stretch, wherein the patterned textile laminate is coupled to the stretch textile substrate, wherein the patterned textile laminate comprises a plurality of holes formed therethrough, the plurality of holes being configured to enhance breathability of the textile assembly, wherein a span of the patterned textile laminate comprises a plurality of gaps formed therethrough, each respective gap of the plurality of gaps being between a respective pair of adjacent tabs, and wherein the plurality of gaps create a gradient of flexibility and compliance within the span of the patterned textile laminate.

2. The textile assembly according to claim 1, comprising axial contours of stretch that vary between a maximum of stretch dictated by the stretch textile substrate, and a minimum of stretch dictated by the patterned textile laminate.

3. The textile assembly according to claim 1, wherein the plurality of gaps cause a degree of elasticity of the textile assembly in a direction substantially perpendicular to the width of the stretch textile substrate to increase along the width towards the first edge and to decrease along the width towards the second edge.

4. The textile assembly according to claim 1, further comprising stitching that repeatedly passes through or across the textile assembly, wherein the stitching is configured to couple the patterned textile laminate to the stretch textile substrate, and wherein the stitching is configured to limit, prevent, and/or reduce stretch along a plurality of contour lines.

5. The textile assembly according to claim 1, wherein each gaps of the plurality of gaps narrows as it extends towards the second edge from the first edge.

6. The textile assembly according to claim 1, wherein a respective far end of the patterned textile laminate is spaced apart from the first edge within the span of the patterned textile laminate, and wherein a respective far end of each respective gap of the plurality of gaps is spaced apart from the second edge.

7. The textile assembly according to claim 1, wherein the plurality of gaps comprises a first row of gaps extending towards the first edge from a first row of holes of the plurality of holes.

8. The textile assembly according to claim 1, wherein each respective tab of each respective pair of adjacent tabs comprises opposing angled sides, and where each respective adjacent pair of tabs is arranged such that a respective distance between a respective pair of adjacent angled sides increases closer to the first edge of the stretch textile substrate and decreases closer to the second edge of the stretch textile substrate.

9. The textile assembly according to claim 1, wherein the textile assembly is breathable.

10. The textile assembly according to claim 1, wherein the stretch textile substrate comprises a first side and a second side opposite the first side, wherein the first side is configured to face away from a wearer's body when the textile assembly is worn, wherein the second side faces the wearer's body when the textile assembly is worn, and wherein the second side faces and/or contacts a breathable stretch glue layer of the textile assembly.

11. The textile assembly according to claim 1, wherein the patterned textile laminate comprises a first layer of PVC-coated nylon and a second layer of PVC-coated nylon, and wherein the first layer and the second layer are arranged with respect to one another such that a first PVC side of the first layer faces a second PVC side of the second layer, wherein the first layer and the second layer are bonded together.

12. The textile assembly according to claim 1, wherein the textile assembly is configured to conform to a body of a wearer of the textile assembly when the textile assembly is worn.

13. The textile strap comprising the textile assembly according to claim 1, and further comprising an outer shell, wherein the textile assembly is positioned between two opposite layers of the outer shell such that the outer shell surrounds and encompasses the textile assembly within a channel of the outer shell.

14. The textile strap according to claim 13, wherein the outer shell comprises elastic edge binding along the first edge of the stretch textile substrate.

15. The textile strap according to claim 13, wherein the outer shell comprises a four-way stretch material, and wherein the outer shell is water vapor permeable.

16. A harness configured to secure a prosthetic device for a user comprising the textile strap according to claim 15.

17. A duty belt comprising the textile strap according to claim 15.

18. A method of making a textile assembly, the method comprising:
    forming a plurality of holes in a patterned textile laminate, wherein the patterned textile laminate is non-stretch or low-stretch, wherein the plurality of holes are configured to enhance breathability of the textile assembly;
    forming a plurality of gaps within a length of the patterned textile laminate, wherein each respective gap of the plurality of gaps is positioned between a respective adjacent pair of tabs, and wherein the plurality of gaps create a gradient of flexibility and compliance within the length of the patterned textile laminate; and
    coupling a stretch textile substrate to the patterned textile laminate, wherein the stretch textile substrate has a width extending from a first edge to a second edge, and wherein the plurality of gaps are spaced apart from the first edge and the second edge.

19. The method according to claim 18, further comprising:
    determining a desired degree of elasticity or stretch along the first edge of the stretch textile substrate; and
    determining a number, an orientation, and a placement of the plurality of gaps to create the desired degree of elasticity or stretch along the first edge of the stretch textile substrate.

\* \* \* \* \*